(12) United States Patent
Kommidi et al.

(10) Patent No.: US 8,284,790 B1
(45) Date of Patent: Oct. 9, 2012

(54) PACKET SWITCH WITH ENQUEUE STRUCTURE FOR ODERING PACKETS

(75) Inventors: Raghunath Reddy Kommidi, Hyderbad (IN); David Alan Brown, Carp, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 418 days.

(21) Appl. No.: 12/701,472

(22) Filed: Feb. 5, 2010

(51) Int. Cl.
*H04L 12/56* (2006.01)
(52) U.S. Cl. .......................................................... 370/416
(58) Field of Classification Search .................. 370/412, 370/415, 416
See application file for complete search history.

*Primary Examiner* — Man Phan
*Assistant Examiner* — Kevin Lee
(74) *Attorney, Agent, or Firm* — Kenneth Glass; Stanley J. Pawlik; Glass & Associates

(57) ABSTRACT

A packet switch receives packets at an ingress port, generates enqueue records for the packets, and stores the enqueue records in an enqueue structure. The enqueue record of a packet includes a pass flag for indicating whether a permissive passing rule is applicable to the packet. The packet switch determines a routing order for the packets stored in the ingress port based on the enqueue records and a set of ordering rules including the permissive passing rule. If a packet is blocked in the packet switch, the packet switch identifies an oldest unblocked routable packet stored in the ingress port based on the enqueue records and the set of ordering rules. Further, the packet switch routes the oldest unblocked routable packet through the packet switch. In this way, the packet switch allows the oldest unblocked routable packet to pass the blocked packet in the packet switch.

14 Claims, 15 Drawing Sheets

PACKET SWITCH WITH ENQUEUE STRUCTURE FOR ODERING PACKETS

BACKGROUND

The Peripheral Component Interconnect Special Interest Group (PCI-SIG) is a non-profit electronics industry consortium responsible for specifying Peripheral Component Interconnect Express (PCIe) standards. One standard specified by PCI-SIG is the PCIe Base Revision 2.0 specification. The PCIe Base 2.0 specification specifies a credit-based, flow-control protocol for transmitting packets between endpoints connected to a PCIe bus.

Additionally, the PCIe Base 2.0 specification specifies basic ordering rules for determining when packets must be reordered to prevent deadlock and inconsistent data from occurring in a distributed producer-consumer ordering model. For example, a packet switch compliant with the PCIe Base 2.0 specification (i.e., a PCIe 2.0 packet switch) may be required to route a packet received at the packet switch before routing another packet previously received at the packet switch when the packet previously received at the packet switch is presently blocked in the packet switch.

In addition to the basic ordering rules, the PCIe Base 2.0 specification specifies relaxed ordering rules and identifier ordering rules. The relaxed ordering rules and the identifier ordering rules specify conditions in which a packet may, but is not required to, pass another packet. Because the relaxed ordering rules and the identifier ordering rules are not required in the PCIe Base 2.0 specification, many packet switches compliant with the PCIe Base 2.0 specification do not implement the relaxed ordering rules or the identifier ordering rules.

SUMMARY

In various embodiments, an ingress port of a packet switch receives packets in a sequential order, stores the packets, and generates enqueue records corresponding to the packets. Each of the enqueue records includes a packet type of the packet corresponding to the enqueue record and a pass flag indicating whether one or more permissive passing rules are applicable to the packet. The packet switch further includes an enqueue structure for storing the enqueue records and an enqueue controller for determining a routing order for the packets based on the enqueue records stored in the enqueue structure and a set of ordering rules including the permissive passing rules. In addition to the permissive passing rules, the set of ordering rules includes requisite passing rules indicating whether a subsequent packet is required to pass a previous packet which is blocked in the packet switch based on the packet types of the subsequent packet and the previous packet. Further, the set of ordering rules includes prohibitive passing rules indicating whether a subsequent packet is prohibited from passing a previous packet based on the packet types of the subsequent packet and the previous packet.

Because each of the enqueue records indicates the packet type of the packet corresponding to the enqueue record and whether one or more permissive passing rules are applicable to the packet, the enqueue controller may quickly determine based on the enqueue records whether the packet is to be routed ahead of another packet which has been previously received at the ingress port but is currently blocked in the ingress port. In various embodiments, the enqueue controller includes a combinational logic circuit to determine based on at least some of the enqueue records stored in the enqueue structure whether a subsequent packet is to be routed ahead of a previous packet that is blocked in the ingress port according to the set of ordering rules.

In some embodiments, the packet switch routes posted packets, non-posted packets, and completion packets. Further, the enqueue controller stores the enqueue records into an enqueue queue of the enqueue structure until a storage capacity of the enqueue queue is reached and stores subsequent enqueue records into an enqueue memory of the enqueue structure, based on the sequential order. In this way, the enqueue queue stores older enqueue records and the enqueue memory stores newer enqueue records. Additionally, the enqueue controller stores a copy of the oldest enqueue record corresponding to a posted packet that is stored in the enqueue memory and a copy of the oldest enqueue record corresponding to a completion packet that is stored in the enqueue memory into dedicated storage units of the enqueue queue. Further, the enqueue controller determines the routing order for the packets based on the enqueue records stored in the enqueue queue. In this way, the enqueue controller determines the routing order for the packets stored in the ingress port based on the enqueue records stored in the enqueue queue.

Because the number of enqueue records stored in the enqueue queue may be less than the number of enqueue records stored in the enqueue structure, the enqueue controller may more quickly determine the routing order for the packets stored in the ingress port in comparison to embodiments in which the enqueue controller determines the routing order for the packets based on all of the enqueue records stored in the enqueue structure. As a result, the size and complexity of the combinational logic circuit in the enqueue controller is reduced and the speed of the combinational logic circuit is increased.

In various embodiments, the enqueue controller prevents deadlock and inconsistent data from occurring in a distributed producer consumer ordering model for the packet switch in contrast to other systems that do not provide such functionality. In some embodiments, the packet switch implements permissive passing rules of the Peripheral Component Interconnect Express (PCIe) Base 2.0 specification that are not implemented in other systems. As a result, packet throughput of the packet switch is increased as compared to systems that do not implement all of the permissive passing rules implemented in the packet switch. Furthermore, because the ingress port generates the enqueue records for the packets and stores the enqueue records into the enqueue structure, the enqueue controller determines the routing order for the packets more quickly than systems that do not include such an enqueue structure. As a result, packet throughput is increased in the packet switch as compared to systems that do not include such an enqueue structure.

A packet switch, in accordance with one embodiment, includes an ingress port, an enqueue structure, an enqueue controller, a switch fabric, and egress ports. The enqueue structure is coupled to the ingress port and the enqueue controller. The switch fabric is coupled to the ingress port and the egress ports. The ingress port is configured to receive packets in a sequential order and generate enqueue records corresponding to the packets. Each of the enqueue records includes a pass flag indicating whether the corresponding packet is permitted to be routed through the packet switch ahead of another packet preceding the corresponding packet in the sequential order based on a permissive passing rule. The enqueue structure includes an enqueue queue and an enqueue memory. Furthermore, the enqueue queue includes an ordered queue and dedicated storage units. The ordered queue is configured to store based on the sequential order newer enqueue records corresponding to packets stored in the ingress port. The enqueue memory is configured to store based on the sequential order older enqueue records corresponding to packets stored in the ingress port. The dedicated storage units are configured to store a copy of the oldest enqueue record stored in the enqueue memory corresponding to a posted packet and a copy of the oldest enqueue record stored in the enqueue memory corresponding to a completion packet. The enqueue controller is configured to determine a routing order for routing the packets from the ingress port to the egress ports based on the enqueue records stored in the enqueue queue and a set of ordering rules including the permissive passing rule. The switch fabric is configured to route the packets from the ingress port to the egress ports in the routing order.

A packet switch, in accordance with one embodiment, includes an ingress port, an enqueue structure, an enqueue controller, a switch fabric, and egress ports. The enqueue structure is coupled to the ingress port and the enqueue controller. The switch fabric is coupled to the ingress port and the egress ports. The ingress port is configured to receive packets in a sequential order and generate enqueue records corresponding to the packets. Each of the enqueue records includes a pass flag indicating whether the corresponding packet is permitted to be routed through the packet switch ahead of a posted packet preceding the corresponding packet in the sequential order based on a permissive passing rule. Moreover, at least one of the enqueue records includes a flow control flag having fewer data bits than a transaction identifier of the corresponding packet. The enqueue structure includes an enqueue queue and an enqueue memory. Furthermore, the enqueue queue includes an ordered queue and dedicated storage units. The ordered queue is configured to store based on the sequential order older enqueue records corresponding to packets stored in the ingress port. The enqueue memory is configured to store based on the sequential order newer enqueue records corresponding to packets stored in the ingress port. The dedicated storage units are configured to store a copy of the oldest enqueue record stored in the enqueue memory corresponding to a posted packet and a copy of the oldest enqueue record stored in the enqueue memory corresponding to a completion packet. The enqueue controller is configured to determine a routing order for routing the packets from the ingress port to the egress ports based on the enqueue records stored in the enqueue queue and a set of ordering rules including the permissive passing rule. The switch fabric is configured to route the packets from the ingress port to the egress ports in the routing order.

A method of routing packets through a packet switch, in accordance with one embodiment, includes receiving packets at an ingress port of a packet switch in a sequential order, storing the packets in the ingress port, and generating enqueue records corresponding to the packets. Each of the enqueue records includes a pass flag indicating whether the corresponding packet is permitted to be routed through the packet switch ahead of another packet preceding the corresponding packet in the sequential order based on a set of ordering rules including the permissive passing rule. The method further includes storing older enqueue records into an enqueue queue based on the sequential order, storing newer enqueue records into an enqueue memory based on the sequential order, storing a copy of the oldest enqueue record stored in the enqueue memory and corresponding to a posted packet into the enqueue queue, and storing a copy of the oldest enqueue record stored in the enqueue memory and corresponding to a completion packet into the enqueue queue. Additionally, the method includes determining a routing order for routing the packets from the ingress port to the egress ports based on the enqueue records and a set of ordering rules including the permissive passing rule. The method also includes routing the packets from the ingress port to the egress ports in the routing order.

In various embodiments, the method of routing packets through the packet switch prevents deadlock and inconsistent data from occurring in a distributed producer consumer ordering model for the packet switch in contrast to other methods that do not provide such functionality. In some embodiments, the method implements permissive passing rules of the PCIe Base 2.0 specification that are not implemented in other methods. As a result, the method increases packet throughput of the packet switch as compared to these other methods. Furthermore, because the method generates enqueue records for packets and stores the enqueue records into an enqueue structure of the packet switch, the method determines the routing order for the packets more quickly than other methods that do not employ such an enqueue structure. As a result, the method increases packet throughput in the packet switch as compared to these other methods.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a packet switch receives packets at an ingress port, generates enqueue records for the packets, and stores the enqueue records in an enqueue structure. The enqueue record of a packet includes a packet type flag indicating a packet type of the packet and a pass flag indicating whether one or more permissive passing rules are applicable to the packet. The packet switch determines a routing order for the packets stored in the ingress port based on the enqueue records and a set of ordering rules including requisite passing rules, prohibitive passing rules, and the permissive passing rules. If a packet is blocked in the packet switch, the packet switch identifies an oldest unblocked routable packet stored in the ingress port based on the enqueue records and the set of ordering rules. Further, the packet switch routes the oldest unblocked routable packet through the packet switch. In this way, the packet switch allows the oldest unblocked routable packet to pass the blocked packet in the packet switch.

Because the packet switch generates the enqueue records for the packets and stores the enqueue records into the enqueue structure, the packet switch may quickly select the oldest unblocked routable packet stored in the ingress port based on the enqueue records stored in the enqueue structure. As a result, packet throughput of the packet switch is increased (e.g., maximized). Furthermore, because the packet switch allows an unblocked routable packet to pass a blocked packet in the packet switch when a permissive passing rule is applicable to the unblocked packet, packet throughput of the packet switch is further increased (e.g., maximized). Moreover, the packet switch prevents deadlock and inconsistent data from occurring in a distributed producer consumer ordering model for the packet switch.

Figure 1:
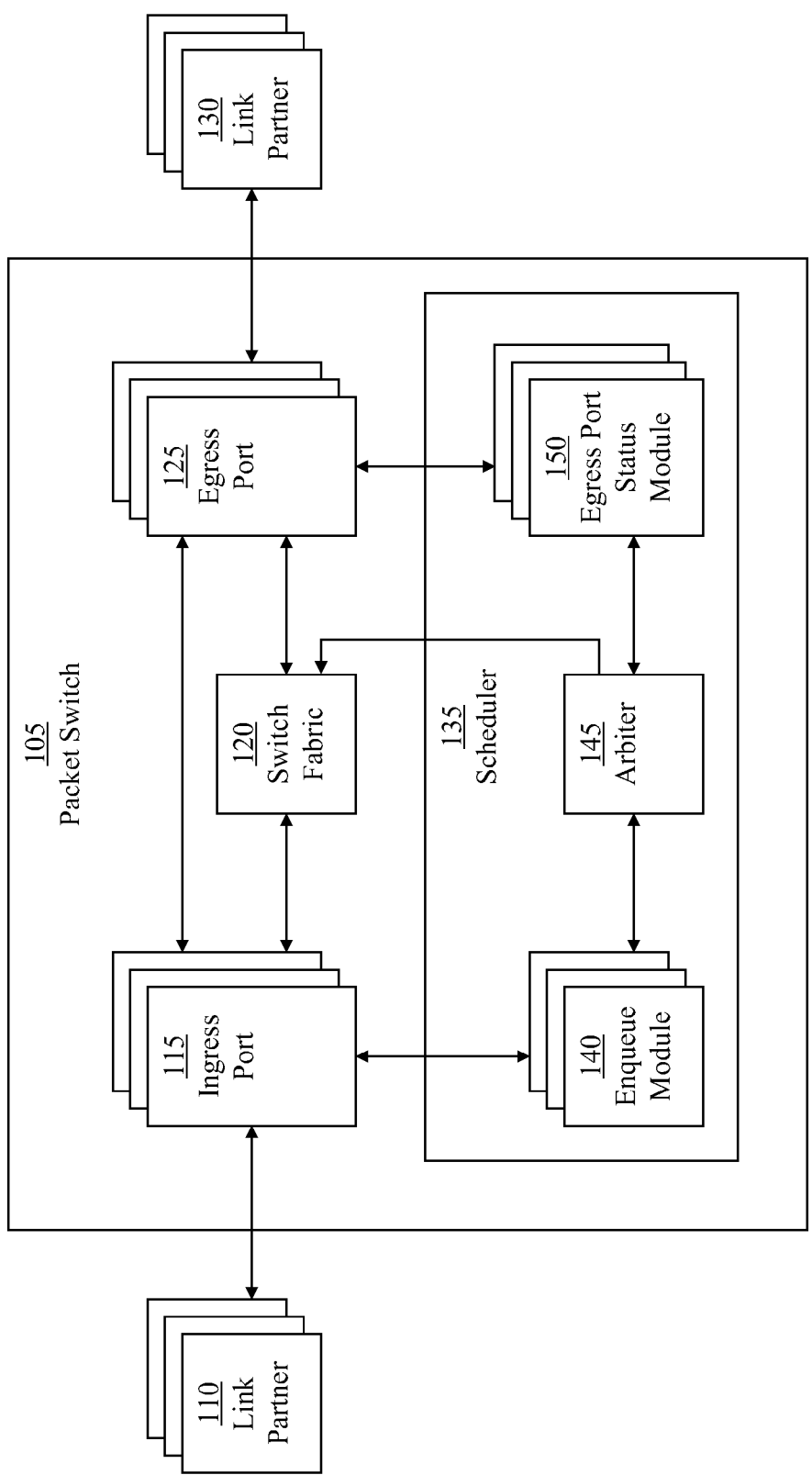
FIG. 1 is a block diagram of a communication system, in accordance with an embodiment of the present invention.

FIG. 1 illustrates a communication system 100, in accordance with an embodiment of the present invention. The communication system 100 includes link partners 110 (e.g., ingress link partners), a packet switch 105, and link partners 130 (e.g., egress link partners). Each of the link partners 110 and each of the link partners 130 is coupled (e.g., connected) to the packet switch 105. In various embodiments, the packet switch 105 routes packets between the link partners 110 and the link partners 130. For example, the packet switch 105 may route a header packet, which includes a packet header but does not include a data payload, from a link partner 110 to a link partner 130. As another example, the packet switch 105 may route a data packet, which includes a packet header and a data payload, from a link partner 110 to a link partner 130.

The packet switch 105 includes ingress ports 115 corresponding to the link partners 110, each of which is coupled (e.g., connected) to the corresponding link partner 110. Additionally, the packet switch 105 includes egress ports 125 corresponding to the link partners 130, each of which is coupled (e.g., connected) to the corresponding link partner 130. The packet switch 105 further includes a switch fabric 120 and a scheduler 135. The switch fabric 120 is coupled (e.g., connected) to the ingress ports 115, the egress ports 125, and the scheduler 135. Additionally, the scheduler 135 is coupled (e.g., connected) to the ingress ports 115 and the egress ports 125.

In various embodiments, the ingress ports 115 provide (e.g., transmit) flow control packets to the link partners 110 for controlling packet flow through the packet switch 105. Moreover, the link partners 110 provide (e.g., transmit) packets to the ingress ports 115 based on the flow control packets. For example, an ingress port 115 may provide a flow control packet to the link partner 110 corresponding to the ingress port 115 indicating credits issued to the link partner 110 from the ingress port 115. In this way the ingress port 115 advertizes the issued credits to the link partner 110. In turn, the link partner 110 determines based on the issued credits whether the ingress port 115 has an available storage capacity for accepting (e.g., storing) a packet from the link partner 110.

If the link partner 110 determines that the ingress port 115 has an available storage capacity for accepting a packet from the link partner 110, the link partner 110 provides the packet to the ingress port 115. Otherwise, if the link partner 110 determines that the ingress port 115 does not have an available storage capacity for accepting a packet from the link partner 110, the link partner 110 does not provide the packet to the ingress port 115. In this case, the link partner 110 may provide the packet to the ingress port 115 after the ingress port 115 issues additional credits to the link partner 110 if the link partner 110 determines based on the additional credits that the ingress port 115 has an available storage capacity for accepting the packet.

In further embodiments, the link partners 130 provide (e.g., transmit) flow control packets to the egress ports 125 for controlling packet flow from the packet switch 105 to the link partners 130. For example, a link partner 130 may provide a flow control packet to the egress port 125 corresponding to the link partner 130 indicating credits issued to the egress port 125 from the link partner 130. In this way, the link partner 130 advertizes the issued credits to the link partner 110. In turn, the egress port 125 determines based on the issued credits whether the link partner 130 has an available storage capacity for accepting (e.g., storing) a packet from the egress port 125.

If the egress port 125 determines that the link partner 130 has an available storage capacity for accepting a packet from the egress port 125, the egress port 125 provides (e.g., transmits) the packet to the link partner 130. Otherwise, if the egress port 125 determines that the link partner 130 does not have an available storage capacity for accepting a packet from the egress port 125, the egress port 125 does not provide the packet to the link partner 130. In this case, the egress port 125 may provide the packet to the link partner 130 after the link partner 130 issues additional credits to the egress port 125 if the egress port 125 determines based on the additional credits that the link partner 130 has an available storage capacity for accepting the packet.

The scheduler 135 selects packets stored in the ingress ports 115 and identifies one or more egress ports 125 for each selected packet. Additionally, the scheduler 135 configures the switch fabric 120 for routing the selected packets to the destination egress ports 125 of the packets. For example, the scheduler 135 may provide data (e.g., a signal) to the switch fabric 120 for configuring switches in the switch fabric 120. In turn, the switch fabric 120 routes the selected packets to the destination egress ports 125. In various embodiments, the scheduler 135 selects packets in a scheduling cycle and the switch fabric 120 routes the selected packets to the destination egress ports 125 in a routing cycle (e.g., a next routing cycle) following the scheduling cycle.

In various embodiments, the scheduler 135 includes enqueue modules 140 corresponding to the ingress ports 115, an arbiter 145, and egress port status modules 150 corresponding to the egress ports 125. Each of the enqueue modules 140 is coupled (e.g., connected) to the corresponding ingress port 115. Each of the egress port status modules 150 is coupled (e.g., connected) to the corresponding egress port 125. Additionally, the arbiter 145 is coupled (e.g., connected) to the enqueue modules 140, the switch fabric 120, and the egress port status modules 150.

The egress port status modules 150 generate a port state for each of the egress ports 125 indicating a status of the egress port 125. In various embodiments, the port state of an egress port 125 indicates whether the egress port 125 is able to accept a packet routed from an ingress port 115 to the egress port 125. For example, the port state of an egress port 125 may indicating whether the egress port 125 has an available storage capacity for storing a packet and may indicate credits issued to the arbiter 145 for routing packets to the egress port 125. In a further example, the issued credits may include credits corresponding to packet types of packets. In this way, the port state of the egress port 125 indicates whether the egress port 125 is able to accept packets based on the packet types of the packets.

In some embodiments, the egress port state of an egress port 125 includes a data bit indicating whether the corresponding egress port 125 has an available storage capacity for storing a maximum sized packet. In some embodiments, the egress port state includes more than one data bit indicating a size of an available storage capacity of a corresponding egress port 125 for storing a packet.

In operation, the ingress ports 115 receive packets from the corresponding link partners 110 and generate an enqueue record for each of the packets, as is described more fully herein. In this process, an ingress port 115 that receives a packet determines whether one or more permissive pass rules are applicable to the packet and sets a pass flag in the enqueue record of the packet if one or more of the permissive pass rules are applicable to the packet. Additionally, the ingress port 115 set a packet type flag in the enqueue record of the packet indicating a packet type of the packet. The arbiter 145 determines the order for routing the packets to the egress ports 125 based on the enqueue records of the packets and a set of ordering rules. In this way, the arbiter 145 orders the packets to prevent deadlock and inconsistent data from occurring in the communication system 100 from the viewpoint of a distributed producer consumer ordering model.

In various embodiments, the ingress ports 115 communicate with the egress ports 125 to determine when credits consumed by packets stored in the ingress ports 115 are released by the egress ports 125. For example, an egress port 125 may provide data to an ingress port 115 indicating that credits are released for a packet routed from the ingress port 115 to the egress port 125. For example, the egress port 125 may indicate that the credits are released in response to the egress port 125 storing the packet. In this way, the egress port 125 indicates when the credits of the ingress port 115 consumed by the packet are available. In turn, the ingress port 115 may issue (e.g., advertize) the available credits to the link partner 110 corresponding to the ingress port 115.

In some embodiments, the packet switch 105 is implemented in an integrated circuit of an integrated circuit device which may include an integrated circuit package containing the integrated circuit. In some embodiments, the packet switch 105 is implemented in more than one integrated circuit of an integrated circuit device which may include a multichip package containing the integrated circuits.

In various embodiments, the packet switch 105 implements a set of ordering rules for routing packets through the packet switch 105 as is specified in a Peripheral Component Interconnect Express (PCIe) Specification. In some embodiments, the packet switch 105 implements a set of ordering rules specified in the PCIe Base 2.0 specification or the PCIe Base Revision 2.1 specification, each of which is incorporated herein by reference. In some embodiments, the packet switch 105 implements more than one set of ordering rules specified in a PCIe specification. In these embodiments, the packet switch 105 selects a set of ordering rules, for example based on input to the packet switch 105, and implements the selected set of ordering rules. In various embodiments, the packet switch implements permissive passing rules of the PCI Express Base 2.0 specification that are not implemented in other systems. As a result, packet throughput of the packet switch is increased as compared to systems that do not implement all of the permissive passing rules implemented in the packet switch 105.

Figure 2:
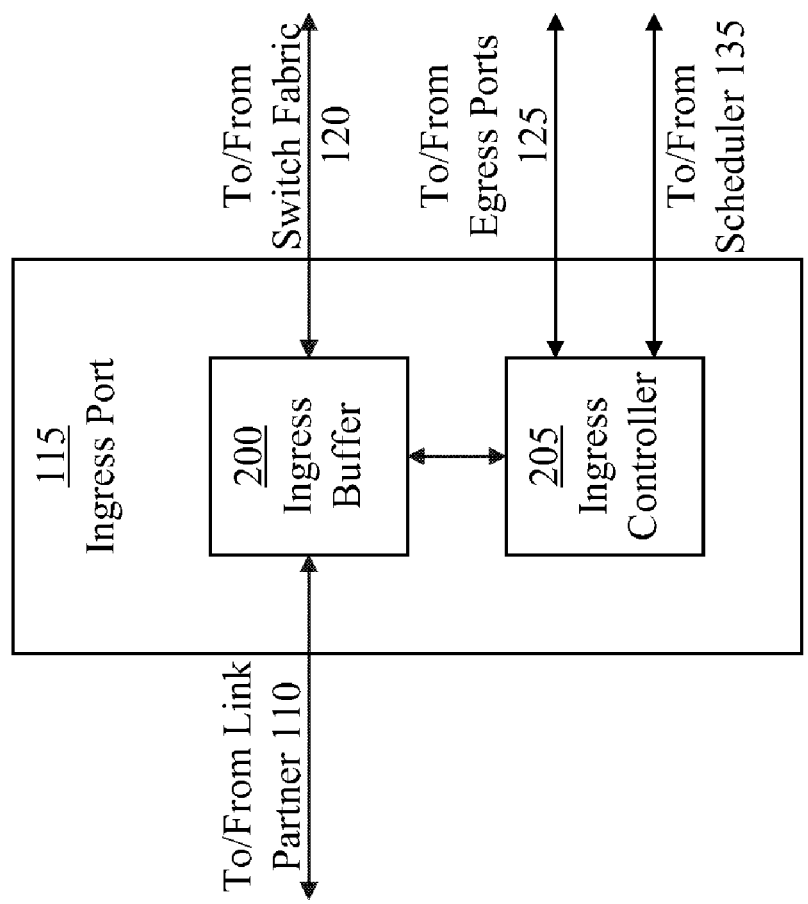
FIG. 2 is a block diagram of an ingress port, in accordance with an embodiment of the present invention.

FIG. 2 illustrates the ingress port 115, in accordance with an embodiment of the present invention. The ingress port 115 includes an ingress buffer 200 and an ingress controller 205 coupled (e.g., connected) to the ingress buffer 200. The ingress buffer 200 stores packets received by the ingress port 115, for example packets received from the link partner 110 corresponding to the ingress port 115. The ingress controller 205 generates an enqueue record for each of the packets based on a set of ordering rules. Further, the ingress controller 205 provides (e.g., transmits) the enqueue record to the enqueue module 140 corresponding to the ingress port 115 in the scheduler 135.

In various embodiments, the ingress controller 205 receives the packets in an ordered sequence and provides the enqueue records to the corresponding enqueue module 140 in a corresponding ordered sequence. Moreover, each of the enqueue records identifies the corresponding packet stored in the ingress buffer 200 of the ingress port 115. In this way, the ordered sequence of enqueue records identifies the ordered sequence of the packets received by the ingress port 115.

Figure 3:
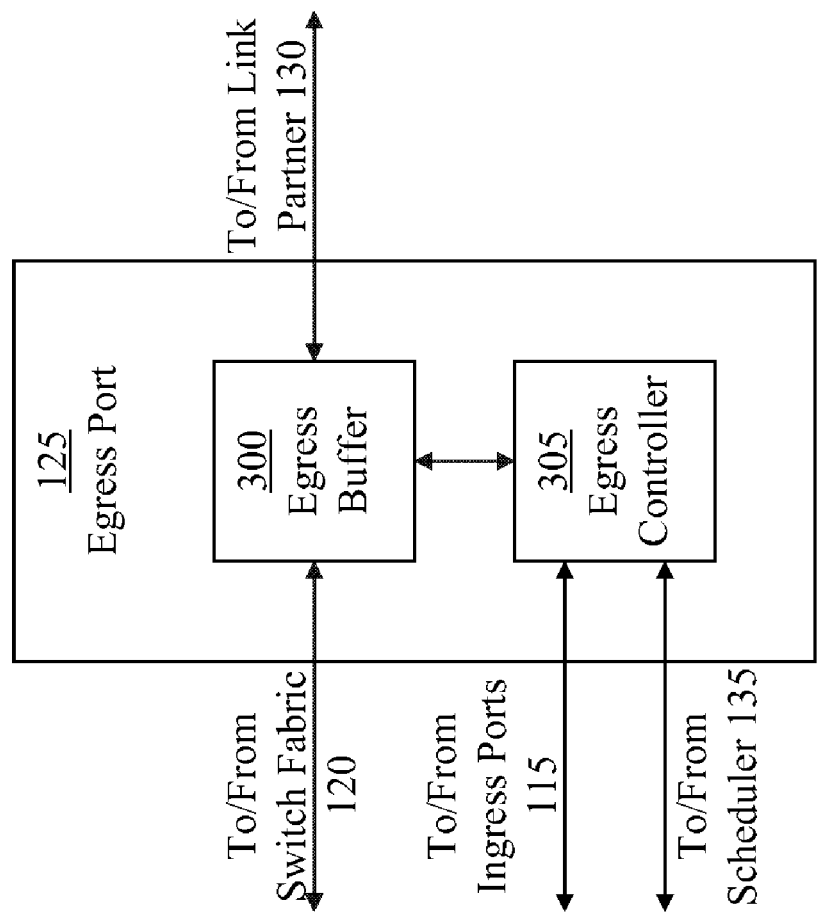
FIG. 3 is a block diagram of an egress port, in accordance with an embodiment of the present invention.

FIG. 3 illustrates the egress port 125, in accordance with an embodiment of the present invention. The egress port 125 includes an egress buffer 300 and an egress controller 305 coupled (e.g., connected) to the egress buffer 300. The egress buffer 300 stores packets received by the egress port 125, for example packets received from an ingress port 115 through the switch fabric 120. The egress controller 305 provides status data of the egress port 125 to the scheduler 135. For example, the status data may include data indicating an available storage capacity of the egress buffer 300 and credits of the egress port 125 issued to the arbiter 145. In some embodiments, the egress controller 305 provides status data of the egress port 125 to the ingress ports 115. For example, the status data may include data indicating credits released for a packet routed from an ingress port 115 to the egress port 125 and stored in the egress buffer 300 of the egress port 125.

Figure 4:
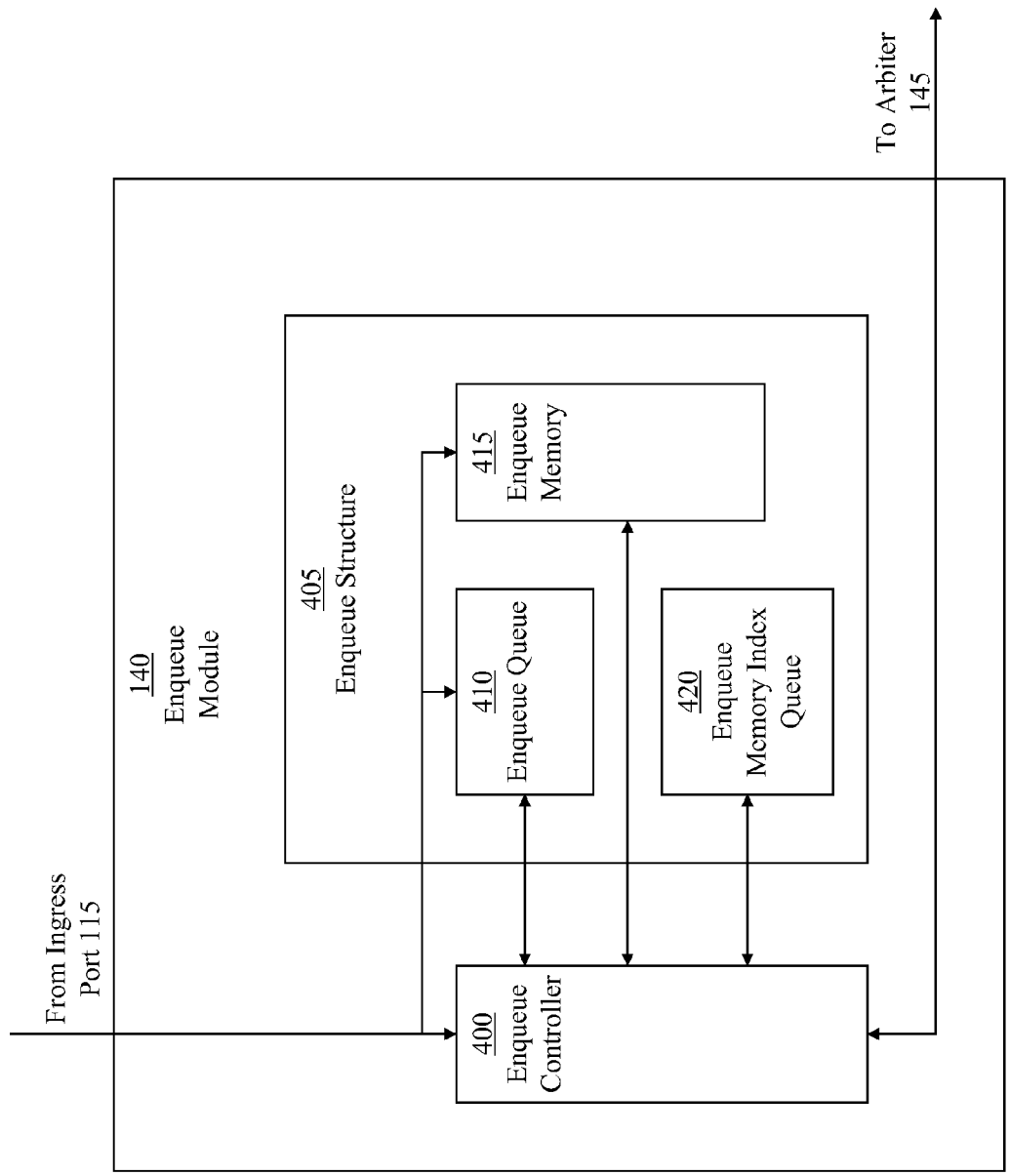
FIG. 4 is a block diagram of an enqueue module, in accordance with an embodiment of the present invention.

FIG. 4 illustrates the enqueue module 140, in accordance with an embodiment of the present invention. The enqueue module 140 includes an enqueue controller 400 and an enqueue structure 405 coupled (e.g., connected) to the enqueue controller 400. The ingress port 115 corresponding to the enqueue structure 405 generates enqueue records and stores (e.g., writes) the enqueue records into the enqueue structure 405. The enqueue controller 400 manages enqueue records stored in the enqueue structure 405, selects enqueue records corresponding to packets stored in the corresponding ingress port 115, and provides the selected enqueue records to the arbiter 145. In this way, the enqueue controller 400 determines a routing order for the packets stored in the corresponding ingress port 115.

Because the enqueue controller 400 determines the routing order for the packets stored in the corresponding ingress port 115 based on the corresponding enqueue records stored in the enqueue structure 405, the enqueue controller 400 determines the routing order for the packets more quickly than systems that do not generate the enqueue records or include the enqueue structure 405. For example, the enqueue controller 400 may select a packet stored in the ingress port 115 for routing more quickly than other systems that do not include the enqueue structure 405 because propagation delays in logic circuitry of the enqueue controller 400 are less than that of logic circuitry in the other systems for selecting a packet for routing. As a result, packet throughput is increased in the packet switch 105 as compared to systems that do not include the enqueue structure 405.

In various embodiments, the enqueue controller 400 manages the enqueue records stored in the enqueue structure 405 based on the ordered sequence in which the enqueue module 140 received the enqueue records from the corresponding ingress port 115. In this way, the enqueue controller 400 maintains the order sequence of the enqueue records. Further, the enqueue controller 400 selects the enqueue record stored in the enqueue structure 405 corresponding to the oldest unblocked routable packet, if any, stored in the corresponding ingress port 115. For example, the enqueue controller 400 may select the enqueue record in a scheduling cycle. In various embodiments, the enqueue controller 400 includes a combinational logic circuit for selecting the oldest unblocked routable packet stored in the ingress port 115 by substantially simultaneously identifying the enqueue records of unblocked routable packets stored in the ingress port 115 based on a set of ordering rules implemented by the packet switch 105 and selecting the enqueue record of the oldest unblocked routable packet stored in the ingress port 115. Because the combinational logic circuit identifies the enqueue records of the unblocked routable packets substantially simultaneously (e.g., in parallel), the enqueue controller 400 may select the oldest unblocked routable packet stored in the ingress port 115 more quickly than other systems. For example, the enqueue controller 400 may select the oldest unblocked routable packet stored in the ingress port 115 in a single clock cycle of a clock signal in the packet switch 105.

In some embodiments, the enqueue controller 400 determines whether packets stored in the ingress port 115 corresponding to the enqueue records are blocked or unblocked. For example, the enqueue controller 400 may determine in a scheduling cycle based on the enqueue records stored in the enqueue structure 405 whether a packet corresponding to an enqueue record is blocked and or unblocked. Also in the scheduling cycle, the enqueue controller 400 determines whether packets stored in the ingress port 115 corresponding to the enqueue records are routable to egress ports 125 of the packet switch 105. For example, the enqueue controller 400 may determine in a scheduling cycle based on the enqueue records stored in the enqueue structure 405 whether a packet corresponding to an enqueue record is routable to an egress port 125 of the packet switch 105. Moreover, the enqueue controller 400 selects the enqueue record stored in the enqueue structure 405 corresponding to the oldest unblocked routable packet stored in the corresponding ingress port 115.

In various embodiments, the enqueue controller 400 determines the routing order for routing packets stored in the ingress port 115 by passing a packet ahead of another packet in the sequential order in which the ingress port 125 receives the packets, based on the enqueue records and a set of ordering rules implemented by the packet switch 105. In this way, the enqueue controller 400 determines the routing order for routing the packets from the ingress port 115 to the egress ports 125 of the packet switch 105.

The enqueue controller 400 provides the selected enqueue records to the arbiter 145. The arbiter 145 selects packets stored in the ingress ports 115 based on enqueue records received from the enqueue modules 140 and the egress states of the egress ports 125 received from the egress port status modules 150. In turn, the switch fabric 120 routes the selected packets to the egress ports 125 in a routing cycle. In various embodiments, a scheduling cycle may be one or more clock cycles of a clock signal in the packet switch 105. Moreover, a routing cycle may be one or more clock cycles of the clock signal.

In various embodiments, the enqueue structure 405 includes an enqueue queue 410, an enqueue memory 415, and an enqueue memory index queue 420. The enqueue controller 400 stores enqueue records into the enqueue queue 410 substantially in the ordered sequence in which the corresponding ingress port 115 provides the enqueue records to the enqueue module 140, as is described more fully herein. Moreover, the enqueue controller 400 identifies an oldest unblocked routable packet stored in the ingress port 115 corresponding to the enqueue module 140 by identifying the corresponding enqueue record stored in the enqueue queue 410 (i.e., the enqueue record of the packet).

If the enqueue queue 410 is filled to capacity with enqueue records (i.e., the enqueue queue 410 is full), the enqueue controller 400 stores subsequent enqueue records received from the ingress port 115 into the enqueue memory 415. In this way, the enqueue controller 400 stores older enqueue records in the enqueue queue 410 and stores newer enqueue records in the enqueue memory 415. Moreover, the enqueue controller 400 moves enqueue records from the enqueue memory 415 to the enqueue queue 410 based on the ordered sequence as storage capacity of the enqueue queue 410 becomes available. In this way, the enqueue queue 410 substantially contains the oldest enqueue records stored in the enqueue structure 405 and the enqueue memory 415 contains the newest enqueue records stored in the enqueue structure 405, as is described more fully herein.

For example, the storage capacity of the enqueue queue 410 may become available when the enqueue controller 400 selects an enqueue record and provides the selected enqueue record to the arbiter 145. In this example, the enqueue controller 400 deletes the selected enqueue record from the enqueue queue 410 and moves the oldest enqueue record stored in the enqueue memory 415 to the enqueue queue 410.

The enqueue memory index queue 420 stores packet types of the packets corresponding to enqueue records stored in the enqueue memory 415. Moreover, the enqueue memory index queue 420 indicates the order in which the enqueue records are stored into the enqueue memory 415. The enqueue controller 400 controller identifies the oldest enqueue record stored in the enqueue memory 415 based on the packet types stored in the enqueue memory index queue 420, as is described more fully herein.

In various embodiments, the packet types of packets routed through the packet switch 105 include posted packets, non-posted packets, and completion packets. In further embodiments, the packet types of packets routed through the packet switch 105 include posted packets, non-posted read packets, non-posted data packets, and completion packets. In these embodiments, non-posted read packets and non-posted data packets are non-posted packets.

In various embodiments, the enqueue controller 400 of the enqueue module 140 stores the enqueue records of the oldest packets stored in the corresponding ingress port 115 into the enqueue queue 410 along with the enqueue record of the oldest posted packet stored in the corresponding ingress port 115, if any, and the enqueue record of the oldest completion packet stored in the corresponding ingress port 115, if any. As a result, an enqueue record stored in the enqueue memory 415 may correspond to a packet stored in the ingress port 115 that is newer than the oldest posted packet stored in the ingress port 115 or the oldest completion packet stored in the ingress port 115, or both.

The enqueue controller 400 stores the enqueue records of the oldest posted packet and the oldest completion packet into the enqueue queue 410 to facilitate selection of the enqueue record corresponding to the oldest unblocked routable packet stored in the ingress port 115, as is described more fully herein. In this way, the enqueue controller 400 stores the enqueue records into the enqueue structure 405 substantially in the ordered sequence in which the enqueue module 140 received the enqueue records from the corresponding ingress port 115.

In various embodiments, the packet switch 105 implements a set of ordering rules for routing packets through the packet switch 105 as is specified in a PCIe Specification, such as the PCIe Base 2.0 specification or the PCIe Base Revision 2.1 specification. In these embodiments, each packet received by the packet switch 105 and routed through the packet switch 105 represents a transaction through the packet switch 105, which may be a posted request, non-posted request, or a completion. A posted request or a non-posted request initiates a transaction sequence. A completion corresponds to a previous request and terminates, or partially terminates, a transaction sequence initiated by the previous request. Moreover, a non-posted request may be a non-posted read request or non-posted data request (i.e., a non-posted request with data).

In these embodiments, a posted packet is a posted request, a non-posted packet is a non-posted request, and a completion packet is a completion. Additionally, a non-posted read packet is a non-posted read request in which the packet includes a packet header but not including a data payload. A non-posted data packet is a non-posted data request in which the packet includes a packet header and a data payload. Additionally, a posted request may be a memory write request or a message request. A non-posted read request may be a configuration read request, an I/O read request, or a memory read request. A non-posted data request may be a configuration write request, an I/O write request, or an atomic operation (AtomicOp) request.

In various embodiments, the set of ordering rules include basic ordering rules, relaxed ordering rules, identification ordering (IDO) rules, or a combination of the relaxed ordering rules and the identification ordering rules (i.e., relaxed and identification ordering rules). In some embodiments, the packet switch 105 implements more than one of the sets of ordering rules. For example, the packet switch 105 may implement the basic ordering rules as well as the relaxed and identification ordering rules. In these embodiments, the packet switch 105 selects one of the sets of ordering rules (e.g., the relaxed and identification ordering rules) based on user input to the packet switch 105 and implements the selected set of ordering rules.

The set of ordering rules implemented by a packet switch 105 specifies an order in which packets received by the packet switch 105 may be routed though the packet switch 105. Generally, the set of ordering rules prevents deadlock from occurring in the communication system 100 for packets routed through the packet switch 105 and also prevents the packet switch 105 from generating inconsistent data in the communication system 100 from the viewpoint of a distributed producer consumer ordering model. Moreover, the set of ordering rules include requisite passing rules, permissive passing rules, or prohibitive passing rules, or some combination thereof.

A requisite passing rule specifies a type of packet received by the packet switch 105 (i.e., a subsequent transaction) that must be allowed to pass a type of packet previously received by the packet switch (i.e., a previous transaction) if the packet previously received by the packet switch 105 is blocked in the packet switch 105. A permissive passing rule specifies a type of packet received by the packet switch 105 (i.e., a subsequent transaction) that may be allowed to pass a type of packet previously received by the packet switch (i.e., a previous transaction), for example if the packet previously received by the packet switch 105 is blocked in the packet switch 105. A prohibitive passing rule specifies a type of packet received by the packet switch 105 (i.e., a subsequent transaction) that is not allowed to pass a type of packet previously received by the packet switch (i.e., a previous transaction).

The basic ordering rules for the packet switch 105 according to the PCIe Base Specification Revision 2.1 are illustrated in Tables 1-4. Table 1 illustrates the basic ordering rules of the packet switch 105 for posted requests, in accordance with an embodiment of the present invention. As illustrated in Table 1, a posted request is prohibited from passing another posted request, required to pass a blocked non-posted read request, and required to pass a blocked non-posted data request. Additionally, a posted request is permitted to pass a completion. In embodiments in which the packet switch 105 functions as a bridge to convert PCIe requests to either PCI requests (i.e., a PCIe to PCI bridge) or to PCI-X requests (i.e., a PCIe to PCI-X bridge), a posted request received at the PCIe side of the bridge is required to pass a completion previously received at the PCIe side of the bridge that is presently blocked in the bridge.

TABLE 1

Basic Ordering Rules for Posted Transactions

| Subsequent Transaction | Previous Transaction | Pass Rule |
|---|---|---|
| Posted Request | Posted Request | Prohibited |
| Posted Request | Non-Posted Read Request | Required |
| Posted Request | Non-Posted Data Request | Required |
| Posted Request | Completion | Permitted |

Table 2 illustrates the basic ordering rules of the packet switch 105 for non-posted read requests, in accordance with an embodiment of the present invention. As illustrated in Table 2, a non-posted read request is prohibited from passing a posted request, permitted to pass a non-posted read request, permitted to pass a non-posted data request, and permitted to pass a completion.

TABLE 2

Basic Ordering Rules for Non-Posted Read Transactions

| Subsequent Transaction | Previous Transaction | Pass Rule |
|---|---|---|
| Non-Posted Read Request | Posted Request | Prohibited |
| Non-Posted Read Request | Non-Posted Read Request | Permitted |
| Non-Posted Read Request | Non-Posted Data Request | Permitted |
| Non-Posted Read Request | Completion | Permitted |

Table 3 illustrates the basic ordering rules of the packet switch 105 for non-posted data requests, in accordance with an embodiment of the present invention. As illustrated in Table 3, a non-posted data request is prohibited from passing a posted request, permitted to pass a non-posted read request, permitted to a non-posted data request, and permitted to pass a completion.

TABLE 3

Basic Ordering Rules for Non-Posted Data Transactions

| Subsequent Transaction | Previous Transaction | Pass Rule |
|---|---|---|
| Non-Posted Data Request | Posted Request | Prohibited |
| Non-Posted Data Request | Non-Posted Read Request | Permitted |
| Non-Posted Data Request | Non-Posted Data Request | Permitted |
| Non-Posted Data Request | Completion | Permitted |

Table 4 illustrates the basic ordering rules of the packet switch 105 for completion transactions, in accordance with an embodiment of the present invention. As illustrated in Table 4, an I/O write completion is permitted to pass a posted request and a configuration write completion is permitted to pass a posted request. As also indicated in Table 4, a completion is required to pass a blocked non-posted read request and required to pass a blocked non-posted data request. Additionally, a completion is permitted to pass another completion if the completions have different transaction identifiers.

TABLE 4

Basic Ordering Rules for Completion Transactions

| Subsequent Transaction | Previous Transaction | Pass Rule |
|---|---|---|
| Completion | Posted Request | Permitted if subsequent transaction is I/O write completion or configuration write completion |
| Completion | Non-Posted Read Request | Required |
| Completion | Non-Posted Data Request | Required |
| Completion | Completion | Permitted if transaction identifiers differ |

In various embodiments, the packet switch 105 operates according to the basic ordering rules. In these embodiments, the packet switch 105 allows a subsequent transaction to pass a previous transaction if the basic ordering rules require the subsequent transaction to pass the previous transaction. In this way, the packet switch 105 operates according to requisite passing rules of the basic ordering rules. Further, the packet switch 105 prevents a subsequent transaction from passing a previous transaction if the basic ordering rules prohibit the subsequent transaction from passing the previous transaction. In this way, the packet switch 105 operates according to prohibitive passing rules of the basic ordering rules.

In some embodiments, the packet switch 105 allows a subsequent transaction to pass a previous transaction if the basic ordering rules permit the subsequent transaction to pass the previous transaction. In this way, the packet switch 105 operates according to permissive passing rules of the basic ordering rules. In some embodiments, the packet switch 105 operates according to all of the basic ordering rules. In these embodiments, the packet switch 105 implements each of the permissive passing rules of the basic ordering rules in addition to the requisite passing rules and prohibitive passing rules of the basic ordering rules.

In various embodiments, the packet switch 105 selectively allows a subsequent transaction to pass a previous transaction if the basic ordering rules permit the subsequent transaction to pass the previous transaction. In these embodiments, the packet switch 105 operates according to both the requisite passing rules and the prohibitive passing rules of the basic ordering rules but operates according to selected permissive passing rules of the basic ordering rules. For example, an enqueue record may include a transaction identifier for allowing completion transactions having different transaction identifiers to pass each other, as is described more fully herein. As a result, packet throughput of the packet switch 105 is increased as compared to systems that do not implement the selected permissive passing rules of the basic ordering rules. In some embodiments, the selected permissive passing rules include all of the permissive passing rules of the basic ordering rules except for the rule allowing a completion to pass another completion. As a result, packet throughput of the packet switch 105 is increased as compared to systems that do not implement the selected permissive passing rules of the basic ordering rules, and size and power consumption of the packet switch 105 are reduced over embodiments of the packet switch 105 that allow a completion to pass another completion.

In various embodiments in which the packet switch 105 implements permissive passing rules of the basic ordering rules, packet switch 105 determines the routing order for packets stored in an ingress port 115 based on the packet types of the packets indicated in the enqueue records of the packets. For example, the packet switch 105 may determine that a subsequent completion packet stored in an ingress port 115 is to pass a previous completion packet stored in the ingress port 115 based on the packet types and transaction identifiers of the completion packets indicated in the enqueue records of the completion packets.

In some embodiments in the which the packet switch 105 implements the basic ordering rules, an ingress port 115 receives a packet and sets the pass flag of the enqueue record corresponding to the packet to indicate that a selected permissive passing rule is applicable to the packet. For example, an ingress port 115 may receive a completion packet and determine that the completion packet is an I/O write completion packet or a configuration write completion packet based on a header of the completion packet. Further, the ingress port 115 sets the pass flag of the enqueue record corresponding to the packet to indicate that the permissive passing rule allowing a subsequent I/O write completion transaction or configuration write completion transaction to pass a previous posted transaction as indicated in Table 4 is applicable to the completion packet. In turn, the packet switch 105 may determine that the completion packet is to pass a posted packet previously stored in the ingress port 115 which is currently blocked in the ingress port 155, based on the pass flag and packet type flag of the enqueue record of the completion packet and the packet type flag of the enqueue record of the posted packet. If the pass flag in the enqueue record of the completion packet is set and the posted packet is blocked, the packet switch 105 routes the completion packet ahead of the posted packet. In this way, the completion packet passes the posted packet in the packet switch 105.

The relaxed ordering rules for the packet switch 105 according to the PCIe Base Specification Revision 2.1 are illustrated in Tables 5-8. Table 5 illustrates the relaxed ordering rules of the packet switch 105 for posted requests, in accordance with an embodiment of the present invention. The relaxed ordering rules for posted requests are the same as the basic ordering rules for posted requests illustrated in Table 1 except that a posted request (i.e., a subsequent transaction) is permitted to pass another posted request (i.e., a previous transaction) if the relaxed ordering bit is set for the posted request of the subsequent transaction as is illustrated in Table 5.

TABLE 5

Relaxed Ordering Rules for Posted Transactions

| Subsequent Transaction | Previous Transaction | Pass Rule |
|---|---|---|
| Posted Request | Posted Request | Permitted if relaxed ordering bit set for subsequent transaction |
| Posted Request | Non-Posted Read Request | Required |
| Posted Request | Non-Posted Data Request | Required |
| Posted Request | Completion | Permitted |

Table 6 illustrates the relaxed ordering rules of the packet switch 105 for non-posted read requests, in accordance with an embodiment of the present invention. The relaxed ordering rules for non-posted read requests illustrated in Table 5 are the same as the basic ordering rules for non-posted read requests illustrated in Table 2.

TABLE 6

Relaxed Ordering Rules for Non-Posted Read Transactions

| Subsequent Transaction | Previous Transaction | Pass Rule |
|---|---|---|
| Non-Posted Read Request | Posted Request | Prohibited |
| Non-Posted Read Request | Non-Posted Read Request | Permitted |
| Non-Posted Read Request | Non-Posted Data Request | Permitted |
| Non-Posted Read Request | Completion | Permitted |

Table 7 illustrates the relaxed ordering rules of the packet switch 105 for non-posted data requests, in accordance with an embodiment of the present invention. The relaxed ordering rules for non-posted data requests are the same as the basic ordering rules for non-posted data requests illustrated in Table 3 except that a non-posted data request (i.e., a subsequent transaction) is permitted to pass a posted request (i.e., a previous transaction) if the relaxed ordering bit is set for the subsequent transaction as is illustrated in Table 7.

TABLE 7

Relaxed Ordering Rules for Non-Posted Data Transactions

| Subsequent Transaction | Previous Transaction | Pass Rule |
|---|---|---|
| Non-Posted Data Request | Posted Request | Permitted if relaxed ordering bit set for subsequent transaction |
| Non-Posted Data Request | Non-Posted Read Request | Permitted |
| Non-Posted Data Request | Non-Posted Data Request | Permitted |
| Non-Posted Data Request | Completion | Permitted |

Table 8 illustrates the relaxed ordering rules of the packet switch 105 for completion transactions, in accordance with an embodiment of the present invention. The relaxed ordering rules for completions are the same as the basic ordering rules for completions illustrated in Table 4 except that a completion (i.e., a subsequent transaction) is also permitted to pass a posted request (i.e., a previous transaction) if the relaxed ordering bit is set for the subsequent transaction as is illustrated in Table 8. As illustrated in Table 8, an I/O write completion is permitted to pass a posted request and a configuration write completion is permitted to pass a posted request. As is also illustrated in Table 8, a completion is permitted to pass a posted packet if the relaxed ordering bit is set for the completion (i.e., the subsequent transaction).

TABLE 8

Relaxed Ordering Rules for Completion Transactions

| Subsequent Transaction | Previous Transaction | Pass Rule |
|---|---|---|
| Completion | Posted Request | Permitted if subsequent transaction is I/O write completion or configuration write completion, and permitted if relaxed ordering bit set for subsequent transaction |
| Completion | Non-Posted Read Request | Required |
| Completion | Non-Posted Data Request | Required |
| Completion | Completion | Permitted if transaction identifiers differ |

In various embodiments, the packet switch 105 operates according to the relaxed ordering rules. In these embodiments, the packet switch 105 allows a subsequent transaction to pass a previous transaction if the relaxed ordering rules require the subsequent transaction to pass the previous transaction. In this way, the packet switch 105 operates according to requisite passing rules of the relaxed ordering rules. Further, the packet switch 105 prevents a subsequent transaction from passing a previous transaction if the relaxed ordering rules prohibit the subsequent transaction from passing the previous transaction. In this way, the packet switch 105 operates according to prohibitive passing rules of the relaxed ordering rules. In some embodiments, the packet switch 105 allows a subsequent transaction to pass a previous transaction if the relaxed ordering rules permit the subsequent transaction to pass the previous transaction. In this way, the packet switch 105 operates according to permissive passing rules of the relaxed ordering rules. In some embodiments, the packet switch 105 operates according to all of the relaxed ordering rules. In these embodiments, the packet switch 105 implements each of the permissive passing rules of the relaxed ordering rules in addition to the requisite passing rules and prohibitive passing rules of the relaxed ordering rules.

In various embodiments, the packet switch 105 selectively allows a subsequent transaction to pass a previous transaction if the relaxed ordering rules permit the subsequent transaction to pass the previous transaction. In these embodiments, the packet switch 105 operates according to both the requisite passing rules and the prohibitive passing rules of the relaxed ordering rules but operates according to selected permissive passing rules of the relaxed ordering rules. As a result, packet throughput of the packet switch 105 is increased as compared to systems that do not implement the selected permissive passing rules of the relaxed ordering rules. In some embodiments, the selected permissive passing rules include all of the permissive passing rules of the relaxed ordering rules except for the rule allowing a completion to pass another completion. As a result, packet throughput of the packet switch 105 is increased as compared to systems that do not implement the selected permissive passing rules of the relaxed ordering rules, and size and power consumption of the packet switch 105 are reduced over embodiments of the packet switch 105 that allow a completion to pass another completion.

In some embodiments in which the packet switch 105 implements the relaxed ordering rules, an ingress port 115 receives a packet and sets the pass flag of the enqueue record corresponding to the packet to indicate that more than one selected permissive passing rule is applicable to the packet. For example, an ingress port 115 may set the pass flag of the enqueue record of a completion packet if the completion packet is an I/O write completion packet or configuration write completion packet or if a relaxed ordering bit is set in the header of the completion packet. In turn, the packet switch 105 may determine that the completion packet is to pass a posted packet previously stored in the ingress port 115 which is currently blocked in the ingress port 155, based on the pass flag and packet type flag of the enqueue record of the completion packet and the packet type flag of the enqueue record of the posted packet. If the pass flag in the enqueue record of the completion packet is set and the posted packet is blocked, the packet switch 105 routes the completion packet ahead of the posted packet. In this way, the completion packet passes the posted packet in the packet switch 105.

The identifier ordering (ID-ordering) rules for the packet switch 105 according to the PCIe Base Specification Revision 2.1 are illustrated in Tables 9-12. Table 9 illustrates the identifier ordering rules of the packet switch 105 for posted requests, in accordance with an embodiment of the present invention. The identifier ordering rules for posted requests are the same as the basic ordering rules for posted requests illustrated in Table 1 except that a posted request (i.e., a subsequent transaction) is permitted to pass another posted request (i.e., a previous transaction) if the identifier ordering (IDO) bit is set for the subsequent transaction and the source identifier (e.g., requester identifier) of the subsequent transaction is different from the source identifier (e.g., requester identifier) of the previous transaction as is illustrated in Table 9.

TABLE 9

Identifier Ordering Rules for Posted Transactions

| Subsequent Transaction | Previous Transaction | Pass Rule |
|---|---|---|
| Posted Request | Posted Request | Permitted if identifier ordering bit set for subsequent transaction and source identifiers differ |
| Posted Request | Non-Posted Read Request | Required |
| Posted Request | Non-Posted Data Request | Required |
| Posted Request | Completion | Permitted |

Table 10 illustrates the identifier ordering rules of the packet switch 105 for non-posted read requests, in accordance with an embodiment of the present invention. The identifier ordering rules for non-posted read requests are the same as the basic ordering rules for non-posted read requests illustrated in Table 2 except that a non-posted read request (i.e., a subsequent transaction) is permitted to pass a posted request (i.e., a previous transaction) if the identifier ordering (IDO) bit is set for the subsequent transaction and the source identifier (e.g., requester identifier) of the subsequent transaction is different from the source identifier (e.g., requester identifier) of the previous transaction as is illustrated in Table 10.

TABLE 10

Identifier Ordering Rules for Non-Posted Read Transactions

| Subsequent Transaction | Previous Transaction | Pass Rule |
|---|---|---|
| Non-Posted Read Request | Posted Request | Permitted if identifier ordering bit set for subsequent transaction and source identifiers differ |
| Non-Posted Read Request | Non-Posted Read Request | Permitted |
| Non-Posted Read Request | Non-Posted Data Request | Permitted |
| Non-Posted Read Request | Completion | Permitted |

Table 11 illustrates the identifier ordering rules of the packet switch 105 for non-posted data requests, in accordance with an embodiment of the present invention. The identifier ordering rules for non-posted data requests are the same as the basic ordering rules for non-posted data requests illustrated in Table 3 except that a non-posted data request (i.e., a subsequent transaction) is permitted to pass a posted request (i.e., a previous transaction) if the identifier ordering (IDO) bit is set for the subsequent transaction and the source identifier (e.g., requester identifier) of the subsequent transaction is different from the source identifier (e.g., requester identifier) of the previous transaction as is illustrated in Table 11.

TABLE 11

Identifier Ordering Rules for Non-Posted Data Transactions

| Subsequent Transaction | Previous Transaction | Pass Rule |
|---|---|---|
| Non-Posted Data Request | Posted Request | Permitted if identifier ordering bit set for subsequent transaction and source identifiers differ |
| Non-Posted Data Request | Non-Posted Read Request | Permitted |
| Non-Posted Data Request | Non-Posted Data Request | Permitted |
| Non-Posted Data Request | Completion | Permitted |

Table 12 illustrates the identifier ordering rules of the packet switch 105 for completion transactions, in accordance with an embodiment of the present invention. The identifier ordering rules for completions are the same as the basic ordering rules for completions illustrated in Table 4 except that a completion (i.e., a subsequent transaction) is also permitted to pass a posted request (i.e., a previous transaction) if the identifier ordering bit is set for the subsequent transaction and the source identifier (e.g., completer identifier) of the subsequent transaction is different from the source identifier (e.g., requester identifier) of the previous transaction. As illustrated in Table 12, an I/O write completion is permitted to pass a posted request and a configuration write completion is permitted to pass a posted request. As is also illustrated in Table 12, a completion is permitted to pass a posted packet if the identifier ordering bit is set for the completion and the source identifier (e.g., completer identifier) of the completion is different from the source identifier (e.g., requester identifier) of the posted request.

TABLE 12

Identifier Ordering Rules for Completion Transactions

| Subsequent Transaction | Previous Transaction | Pass Rule |
|---|---|---|
| Completion | Posted Request | Permitted if subsequent transaction is I/O write completion or configuration write completion, and permitted if identifier ordering bit set for subsequent transaction and completer identifiers differ |
| Completion | Non-Posted Read Request | Required |
| Completion | Non-Posted Data Request | Required |
| Completion | Completion | Permitted if transaction identifiers differ |

In various embodiments, the packet switch 105 operates according to the identifier ordering rules. In these embodiments, the packet switch 105 allows a subsequent transaction to pass a previous transaction if the identifier ordering rules require the subsequent transaction to pass the previous transaction. In this way, the packet switch 105 operates according to requisite passing rules of the identifier ordering rules. Further, the packet switch 105 prevents a subsequent transaction from passing a previous transaction if the identifier ordering rules prohibit the subsequent transaction from passing the previous transaction. In this way, the packet switch 105 operates according to prohibitive passing rules of the identifier ordering rules. In some embodiments, the packet switch 105 allows a subsequent transaction to pass a previous transaction if the identifier ordering rules permit the subsequent transaction to pass the previous transaction. In this way, the packet switch 105 operates according to permissive passing rules of the identifier ordering rules. In some embodiments, the packet switch 105 operates according to all of the identifier ordering rules. In these embodiments, the packet switch 105 implements each of the permissive passing rules of the identifier ordering rules in addition to the requisite passing rules and prohibitive passing rules of the identifier ordering rules.

In various embodiments, the packet switch 105 selectively allows a subsequent transaction to pass a previous transaction if the identifier ordering rules permit the subsequent transaction to pass the previous transaction. In these embodiments, the packet switch 105 operates according to both the requisite passing rules and the prohibitive passing rules of the identifier ordering rules but operates according to selected permissive passing rules of the identifier ordering rules. As a result, packet throughput of the packet switch 105 is increased as compared to systems that do not implement the selected permissive passing rules of the identifier ordering rules. In some embodiments, the selected permissive passing rules include all of the permissive passing rules of the identifier ordering rules except for the rule allowing a completion to pass another completion. As a result, packet throughput of the packet switch 105 is increased as compared to systems that do not implement the selected permissive passing rules of the identifier ordering rules, and size and power consumption of the packet switch 105 are reduced over embodiments of the packet switch 105 that allow a completion to pass another completion.

In some embodiments in which the packet switch 105 implements the identifier ordering rules, an ingress port 115 receives a packet and sets the pass flag of the enqueue record corresponding to the packet to indicate that more than one selected permissive passing rule is applicable to the packet. For example, an ingress port 115 may set the pass flag of the enqueue record of a completion packet if the completion packet is an I/O write completion packet or configuration write completion packet or if an identifier ordering bit is set in the header of the completion packet. Moreover, the ingress port 115 may set the pass flag to indicate which of the selected permissive passing rules is applicable to the packet. In turn, the packet switch 105 may determine that the completion packet is to pass a posted packet previously stored in the ingress port 115 which is currently blocked in the ingress port 155, based on the pass flag, the packet type flag, and the transaction identifier in the enqueue record of the completion packet and the packet type flag and transaction identifier in the enqueue record of the posted packet. If the pass flag in the enqueue record of the completion packet is set, the posted packet is blocked, and the pass flag indicates that the permissive passing rule which allows an I/O write completion transaction or configuration write completion transaction to pass a posted transaction is applicable to the completion packet, the packet switch 105 routes the completion packet ahead of the posted packet. Moreover, if the pass flag in the enqueue record of the completion packet is set, the posted packet is blocked, the pass flag indicates that the permissive passing rule which allows a completion transaction to pass a posted transaction if the identifier ordering bit is set for the completion transaction is applicable to the completion packet, and the transaction identifiers in the enqueue records of the completion packet and the posted packet differ, the packet switch 105 routes the completion packet ahead of the posted packet. In this way, the completion packet passes the posted packet in the packet switch 105.

A combination of the relaxed ordering rules and the identifier ordering rules for the packet switch 105 according to the PCIe Base Specification Revision 2.1 is illustrated in Tables 13-16. Table 13 illustrates the relaxed and identifier ordering rules of the packet switch 105 for posted requests, in accordance with an embodiment of the present invention. The relaxed and identifier ordering rules for posted requests are the same as the basic ordering rules for posted requests illustrated in Table 1 except that a posted request (i.e., a subsequent transaction) is permitted to pass another posted request (i.e., a previous transaction) if the relaxed ordering bit is set for the posted request of the subsequent transaction or if the identifier ordering (IDO) bit is set for the subsequent transaction and the source identifier of the subsequent transaction (e.g., requester identifier) is different from the source identifier of the previous transaction (e.g., requester identifier) as is illustrated in Table 13.

TABLE 13

Relaxed and Identifier Ordering Rules for Posted Transactions

| Subsequent Transaction | Previous Transaction | Pass Rule |
|---|---|---|
| Posted Request | Posted Request | Permitted if relaxed ordering bit set for subsequent transaction, and permitted if identifier ordering bit set for subsequent transaction and source identifiers differ |
| Posted Request | Non-Posted Read Request | Required |
| Posted Request | Non-Posted Data Request | Required |
| Posted Request | Completion | Permitted |

Table 14 illustrates the relaxed and identifier ordering rules of the packet switch 105 for non-posted read requests, in accordance with an embodiment of the present invention. The relaxed and identifier ordering rules for non-posted read requests are the same as the basic ordering rules for non-posted read requests illustrated in Table 2 except that a non-posted read request (i.e., a subsequent transaction) is permitted to pass a posted request (i.e., a previous transaction) if the identifier ordering (IDO) bit is set for the subsequent transaction and the source identifier of the subsequent transaction (e.g., requester identifier) is different from the source identifier of the previous transaction (e.g., requester identifier) as is illustrated in Table 14.

TABLE 14

Relaxed and Identifier Ordering Rules for Non-Posted Read Transactions

| Subsequent Transaction | Previous Transaction | Pass Rule |
| --- | --- | --- |
| Non-Posted Read Request | Posted Request | Permitted if identifier ordering bit set for subsequent transaction and source identifiers differ |
| Non-Posted Read Request | Non-Posted Read Request | Permitted |
| Non-Posted Read Request | Non-Posted Data Request | Permitted |
| Non-Posted Read Request | Completion | Permitted |

Table 15 illustrates the relaxed and identifier ordering rules of the packet switch 105 for non-posted data requests, in accordance with an embodiment of the present invention. The relaxed and identifier ordering rules for non-posted data requests are the same as the basic ordering rules for non-posted data requests illustrated in Table 3 except that a non-posted data request (i.e., a subsequent transaction) is permitted to pass a posted request (i.e., a previous transaction) if the relaxed ordering bit is set for the posted request of the subsequent transaction or if the identifier ordering (IDO) bit is set for the subsequent transaction and the source identifier of the subsequent transaction (e.g., requester identifier) is different from the source identifier of the previous transaction (e.g., requester identifier) as is illustrated in Table 15.

TABLE 15

Relaxed and Identifier Ordering Rules for Non-Posted Data Transactions

| Subsequent Transaction | Previous Transaction | Pass Rule |
| --- | --- | --- |
| Non-Posted Data Request | Posted Request | Permitted if relaxed ordering bit set for subsequent transaction, and permitted if identifier ordering bit set for subsequent transaction and source identifiers differ |
| Non-Posted Data Request | Non-Posted Read Request | Permitted |
| Non-Posted Data Request | Non-Posted Data Request | Permitted |
| Non-Posted Data Request | Completion | Permitted |

Table 16 illustrates the relaxed and identifier ordering rules of the packet switch 105 for completion transactions, in accordance with an embodiment of the present invention. The relaxed and identifier ordering rules for completions are the same as the basic ordering rules for completions illustrated in Table 4 except that a completion (i.e., a subsequent transaction) is also permitted to pass a posted request (i.e., a previous transaction) if the relaxed ordering bit is set for the subsequent transaction or if the identifier ordering bit is set for the subsequent transaction and the source identifier (e.g., completer identifier) of the subsequent transaction is different from the source identifier of the previous transaction (e.g., completer identifier). As illustrated in Table 16, an I/O write completion is permitted to pass a posted request and a configuration write completion is permitted to pass a posted request. As is also illustrated in Table 16, a completion is permitted to pass a posted packet if the relaxed ordering bit is set for the completion. As is further illustrated in Table 16, a completion is permitted to pass a posted packet if the identifier ordering bit is set for the completion and the completer identifier of the completion is different from the source identifier of the posted request.

TABLE 16

Relaxed and Identifier Ordering Rules for Completion Transactions

| Subsequent Transaction | Previous Transaction | Pass Rule |
| --- | --- | --- |
| Completion | Posted Request | Permitted if subsequent transaction is I/O write completion or configuration write completion, and permitted if relaxed ordering bit set for subsequent transaction, and permitted if identifier ordering bit set for subsequent transaction and request identifiers differ |
| Completion | Non-Posted Read Request | Required |
| Completion | Non-Posted Data Request | Required |
| Completion | Completion | Permitted if transaction identifiers differ |

In various embodiments, the packet switch 105 operates according to the relaxed and identifier ordering rules. In these embodiments, the packet switch 105 allows a subsequent transaction to pass a previous transaction if the relaxed and identifier ordering rules require the subsequent transaction to pass the previous transaction. In this way, the packet switch 105 operates according to requisite passing rules of the relaxed and identifier ordering rules. Further, the packet switch 105 prevents a subsequent transaction from passing a previous transaction if the relaxed and identifier ordering rules prohibit the subsequent transaction from passing the previous transaction. In this way, the packet switch 105 operates according to prohibitive passing rules of the relaxed and identifier ordering rules. In some embodiments, the packet switch 105 allows a subsequent transaction to pass a previous transaction if the relaxed and identifier ordering rules permit the subsequent transaction to pass the previous transaction. In this way, the packet switch 105 operates according to permissive passing rules of the relaxed and identifier ordering rules. In some embodiments, the packet switch 105 operates according to all of the relaxed and identifier ordering rules. In these embodiments, the packet switch 105 implements each of the permissive passing rules of the relaxed and identifier ordering rules in addition to the requisite passing rules and prohibitive passing rules of the relaxed and identifier ordering rules.

In various embodiments, the packet switch 105 selectively allows a subsequent transaction to pass a previous transaction if the relaxed and identifier ordering rules permit the subsequent transaction to pass the previous transaction. In these embodiments, the packet switch 105 operates according to both the requisite passing rules and the prohibitive passing rules of the relaxed and identifier ordering rules but operates according to selected permissive passing rules of the relaxed and identifier ordering rules. As a result, packet throughput of the packet switch 105 is increased as compared to systems that do not implement the selected permissive passing rules of the relaxed and identifier ordering rules. In some embodiments, the selected permissive passing rules include all of the permissive passing rules of the relaxed and identifier ordering rules except for the permissive passing rule allowing a completion to pass another completion. As a result, packet throughput of the packet switch 105 is increased as compared to systems that do not implement the selected permissive passing rules of the relaxed and identifier ordering rules, and size and power consumption of the packet switch 105 are reduced over embodiments of the packet switch 105 that allow a completion to pass another completion.

In some embodiments in which the packet switch 105 implements the relaxed and identifier ordering rules, an ingress port 115 receives a packet and sets the pass flag of the enqueue record corresponding to the packet to indicate that more than one selected permissive passing rule is applicable to the packet. For example, an ingress port 115 may set the pass flag of the enqueue record of a completion packet if the completion packet is an I/O write completion packet or configuration write completion packet, a relaxed ordering bit is set in the header of the completion packet, or an identifier ordering bit is set in the header of the completion packet. Moreover, the ingress port 115 may set the pass flag to indicate which of the selected permissive passing rules is applicable to the packet. In turn, the packet switch 105 may determine that the completion packet is to pass a posted packet previously stored in the ingress port 115 which is currently blocked in the ingress port 155, based on the pass flag, the packet type flag, and the transaction identifier in the enqueue record of the completion packet and the packet type flag and transaction identifier in the enqueue record of the posted packet. If the pass flag in the enqueue record of the completion packet is set, the posted packet is blocked, and the pass flag indicates that the permissive passing rule which allows an I/O write completion transaction or configuration write completion transaction to pass a posted transaction is applicable to the completion packet, the packet switch 105 routes the completion packet ahead of the posted packet.

Additionally, if the pass flag in the enqueue record of the completion packet is set, the posted packet is blocked, the pass flag indicates that the permissive passing rule which allows a completion transaction to pass a posted transaction if the relaxed ordering bit is set for the completion transaction is applicable to the packet, the packet switch 105 routes the completion packet ahead of the posted packet. Furthermore, if the pass flag in the enqueue record of the completion packet is set, the posted packet is blocked, the pass flag indicates that the permissive passing rule which allows a completion transaction to pass a posted transaction if the identifier ordering bit is set for the completion transaction is applicable to the completion packet, and the transaction identifiers in the enqueue records of the completion packet and the posted packet differ, the packet switch 105 routes the completion packet ahead of the posted packet. In this way, the completion packet passes the posted packet in the packet switch 105.

Figure 5A:
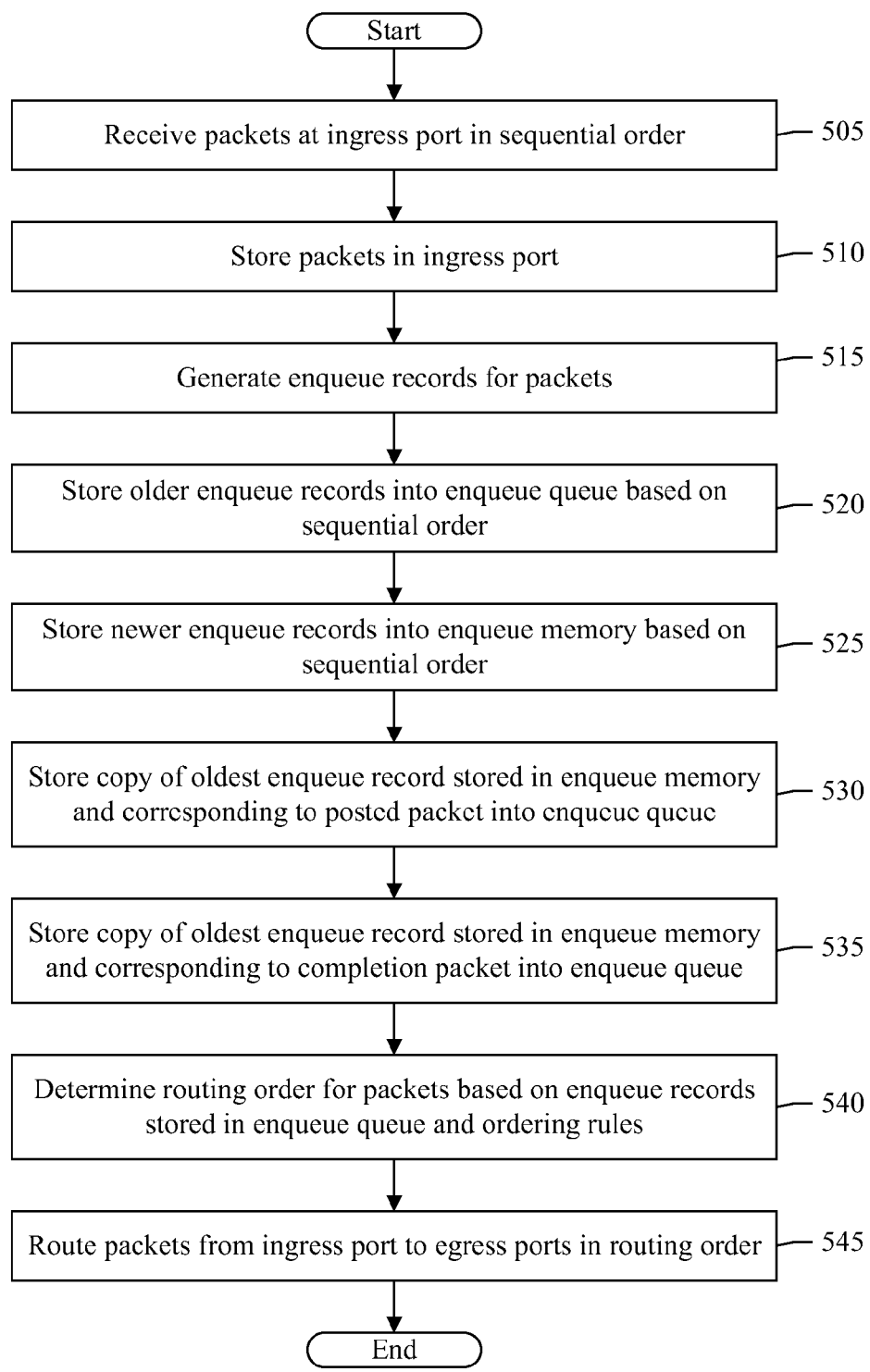
FIG. 5A is a flow chart of a method of routing packets through a packet switch, in accordance with an embodiment of the present invention.

FIG. 5A illustrates a method 500 of routing packets through a packet switch, in accordance with an embodiment of the present invention. In step 505, packets are received at an ingress port of the packet switch in a sequential order. In various embodiments, an ingress port 115 of a packet switch 105 receives the packets in the sequential order, for example from the link partner 110 corresponding to the ingress port 115. The method 500 then proceeds to step 510.

In step 510, the packets are stored in the ingress port. In various embodiments, the ingress port 115 stores the packets received at the ingress port 115. For example, an ingress controller 205 in the ingress port 115 may store the packets in an ingress buffer 200 of the ingress port 115. The method 500 then proceeds to step 515.

In step 515, enqueue records are generated for the packets. In various embodiments, the ingress port 115 generates enqueue records corresponding to the packets. Each of the enqueue records identifies the packet corresponding to the enqueue record, indicates a packet type of the packet, and indicates whether a permissive passing rule is applicable to the packet. Moreover, the permissive passing rule indicates whether the packet is permitted to be routed through the packet switch before another packet preceding the corresponding packet in the sequential order is routed through the packet switch. The method 500 then proceeds to step 520.

In step 520, older enqueue records are stored into an enqueue queue based on the sequential order. In various embodiments, the enqueue module 140 stores older enqueue records into the enqueue queue 410 based on the sequential order. In some embodiments, the enqueue controller 400 stores older enqueue records into the enqueue queue 410 based on the sequential order up to a storage capacity of an ordered queue in the enqueue queue 410. The method 500 then proceeds to step 525.

In step 525, newer enqueue records are stored into an enqueue memory based on the sequential order. In various embodiments, the enqueue controller 400 stores newer enqueue records into the enqueue memory 415 based on the sequential order. In some embodiments, the enqueue controller 400 stores the newer enqueue records into the enqueue memory 415 based on the sequential order when the storage capacity of the enqueue queue 410 is reached. The method 500 then proceeds to step 530.

In step 530, a copy of the oldest enqueue record stored in the enqueue memory and corresponding to a posted packet is stored into the enqueue queue. In various embodiments, the enqueue controller 400 stores a copy of the oldest enqueue record that is stored in the enqueue memory 415 and corresponds to a posted packet into the enqueue queue 410. For example, the enqueue controller 400 may store the oldest enqueue record stored in the enqueue memory 415 corresponding to a posted packet into dedicated storage units of the enqueue queue 410 based on the sequential order. The method 500 then proceeds to step 535.

In step 535, a copy of the oldest enqueue record stored in the enqueue memory and corresponding to a completion packet is stored into the enqueue queue. In various embodiments, the enqueue controller 400 stores a copy of the oldest enqueue record that is stored in the enqueue memory 415 and corresponds to a completion packet into the enqueue queue 410. For example, the enqueue controller 400 may store the oldest enqueue record stored in the enqueue memory 415 corresponding to a completion packet into the dedicated storage units of the enqueue queue 410 based on the sequential order. The method 500 then proceeds to step 540.

In step 540, a routing order is determined for routing the packets from the ingress port to egress ports of the packet switch based on the enqueue records and a set of ordering rules. In various embodiments, an enqueue controller 400 determines the routing order for routing the packets from the ingress port 115 to egress ports 125 of the packet switch 105 based on the enqueue records 700 and a set of ordering rules including the permissive passing rule. In some embodiments, the routing order is initially the same as the ordered sequence in which the ingress port 115 received the packets. The enqueue controller 400 modifies the routing order by passing a packet ahead of another packet in the routing order based on the enqueue records and a set of ordering rules implemented by the packet switch 105. In this way, the enqueue controller 400 determines the routing order for routing the packets from the ingress port 115 to egress ports 125 of the packet switch 105 based on the enqueue records and the set of ordering rules.

For example, the enqueue controller 400 may determine the routing order based on a set of basic ordering rules, a set of relaxed ordering rules, or a set of identifier ordering rules, as described more fully herein. As another example, the enqueue controller 400 may determine the routing order based on a set of relaxed and identifier ordering rules, as described more fully herein. In some embodiments, the enqueue controller 400 selects the set of ordering rules, for example based on input to the packet switch 105. The method 500 then proceeds to step 545.

In step 545, the packets are routed to the egress ports of the packet switch in the routing order. In various embodiments, a switch fabric 120 routes the packets from the ingress port 115 to the egress ports 125 in the routing order. The method 500 then ends.

In various embodiments, the method 500 may include more or fewer than the steps 505-545 illustrated in FIG. 5A and described above. In some embodiments, the steps 505-545 of the method 500 may be performed in a different order than the order illustrated in FIG. 5A and described above. In some embodiments, some of the steps 505-545 of the method 500 may be performed in parallel or substantially simultaneously. In various embodiments, one or more of the steps 505-545 may be performed more than once in the method 500.

Figure 5B:
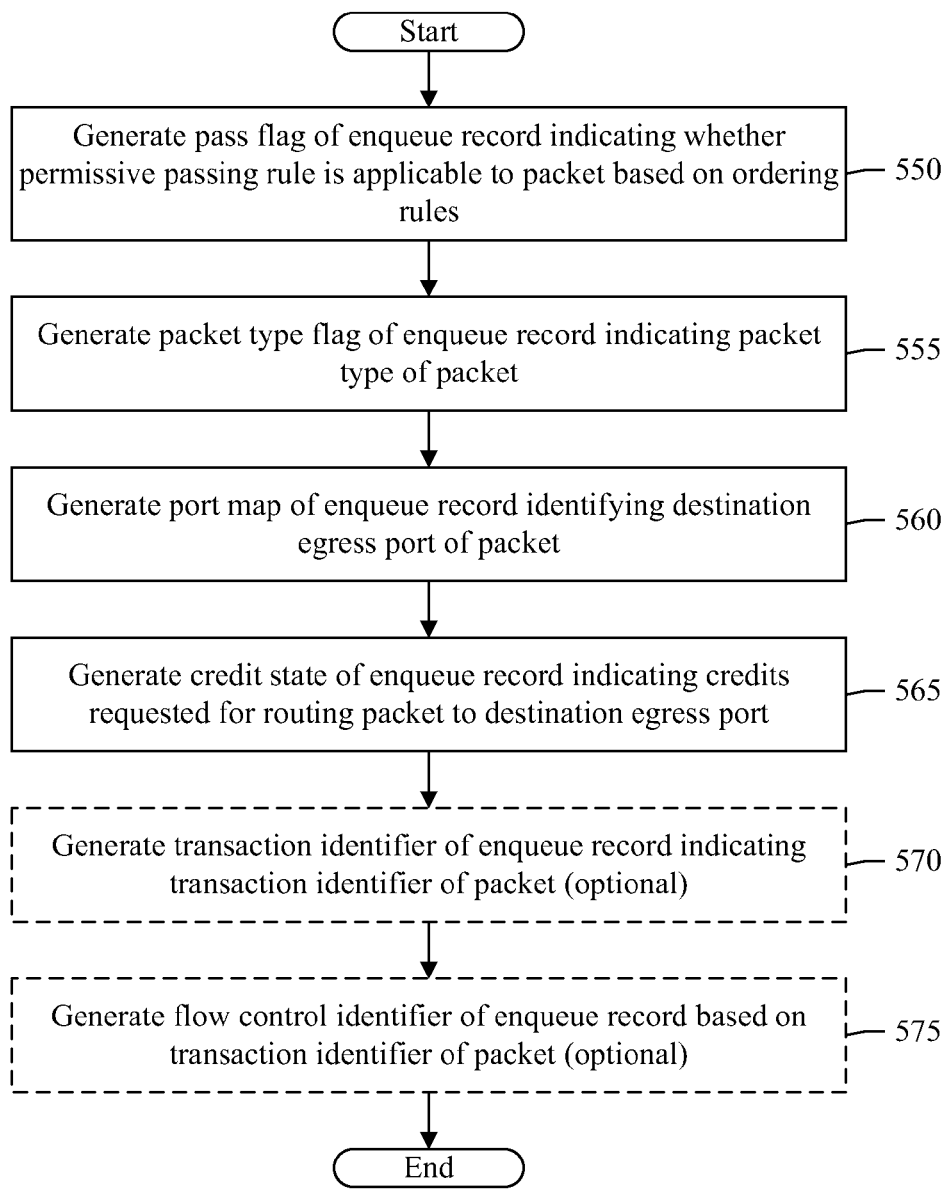
FIG. 5B is a flow chart of a portion of a method of routing packets through a packet switch, in accordance with an embodiment of the present invention.

FIG. 5B illustrates a portion of the method 500 of determining a routing order for routing the packets based on the enqueue records and the set of ordering rules. In this embodiment, the portion of the method 500 is an embodiment of the step 515 of the method 500. In step 550, a pass flag of an enqueue record is generated indicating whether a permissive pass rule is applicable to packet based on the set of ordering rules. In various embodiments, an ingress port 115 generates a pass flag of the enqueue record corresponding to packet received at the ingress port 115 to indicate whether one or more permissive passing rules are applicable to the packet based on the set of ordering rules implemented by the packet switch 105. For example, the ingress port 115 may generate the pass flag based on the header of the packet and the set of ordering rules, as is described more fully herein. The method 500 then proceeds to step 555.

In step 555, a packet type flag of the enqueue record is generated indicating the packet type of the packet. In various embodiments, the ingress port 115 generates a packet type flag of the enqueue record corresponding to packet received at the ingress port 115 to indicate the packet type of the packet. For example, the ingress port 115 may generate the packet type flag based on the header of the packet. The method 500 then proceeds to step 560.

In step 560, a port map of the enqueue record is generated indicating a destination egress port of packet. In various embodiments, the ingress port 115 generates a port map of the enqueue record corresponding to packet received at the ingress port 115 to indicate one or more of the egress ports 125 as a destination egress port 125 of the packet. For example, the ingress port 115 may generate the port map identifying each destination egress port 125 of the packet based on the header of the packet. The method 500 then proceeds to step 565.

In various embodiments, the ingress port 115 generates a credit state of the enqueue record corresponding to packet received at the ingress port 115 to indicate credits requested for routing the packet to one or more destination egress ports of the packet. For example, the ingress port 115 may generate the credit state based on the header of the packet. The method 500 then proceeds to step 570.

In optional step 570, a transaction identifier of the enqueue record is generated indicating a transaction identifier of the packet. In various embodiments, the ingress port 115 generates a transaction identifier of the enqueue record corresponding to packet received at the ingress port 115 to indicate the transaction identifier of the packet. For example, the ingress port 115 may generate the transaction identifier of the enqueue record based on a transaction identifier in the header of the packet. The method 500 then proceeds to step 575.

In optional step 575, a flow control identifier of the enqueue record is generated based on a transaction identifier of the packet. In various embodiments, the ingress port 115 generates a flow control identifier of the enqueue record corresponding to packet received at the ingress port 115 based on a transaction identifier in the header of the packet. For example, the ingress port 115 may generate the flow control identifier of the enqueue record by hashing the transaction identifier in the header of the packet. In various embodiments, the method 500 proceeds to step 520 after step 575.

In various embodiments, the step 515 of the method 500 may include more or fewer than the steps 550-575 illustrated in FIG. 5B and described above. In some embodiments, the steps 550-575 of the method 500 may be performed in a different order than the order illustrated in FIG. 5B and described above. In some embodiments, some of the steps 550-575 of the method 500 may be performed in parallel or substantially simultaneously. For example, all of the steps 550-575 may be performed in parallel or substantially simultaneously. In various embodiments, one or more of the steps 550-575 may be performed more than once in the method 500.

Figure 5C:
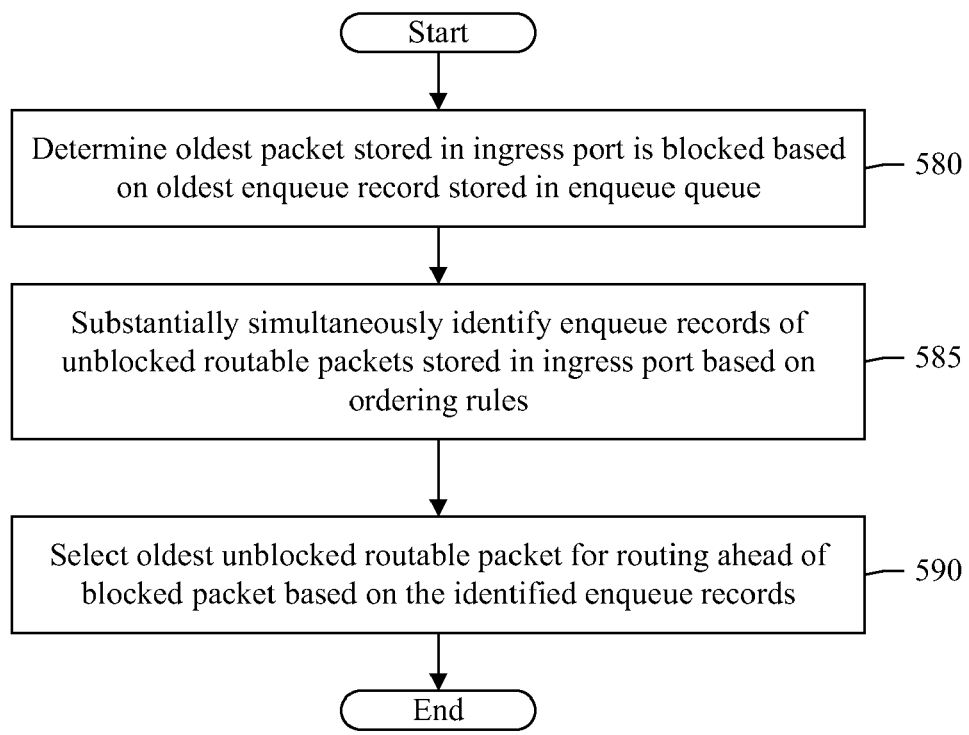
FIG. 5C is a flow chart of a portion of a method of routing packets through a packet switch, in accordance with an embodiment of the present invention.

FIG. 5C illustrates a portion of the method 500 of determining a routing order for routing the packets based on the enqueue records and the set of ordering rules. In this embodiment, the portion of the method 500 is an embodiment of the step 540 of the method 500. In step 580, the oldest packet stored in the ingress port is determined to be blocked. In various embodiments, the enqueue controller 400 determines the oldest packet stored in the ingress port 115 is blocked based on the oldest enqueue record stored in the enqueue queue 410. For example, the enqueue record of the oldest packet stored in the ingress port 115 corresponding to the enqueue module 140 is stored at a head of the enqueue queue 410.

In some embodiments, the enqueue controller 400 determines that a destination egress port 125 of the oldest packet stored in the ingress port 115 is not able to accept the oldest packet stored in the ingress port 115 based on both a port map and a credit state of the enqueue record corresponding to the oldest packet stored in the ingress port 115 and the port state of the destination egress port 125. In this way, the enqueue controller 400 determines that the oldest packet stored in the ingress port 115 is blocked. The method 500 then proceeds to step 585.

In step 585, the enqueue records of unblocked routable packets stored in the ingress port are identified substantially simultaneously based on the ordering rules. In various embodiments, the enqueue controller 400 identifies the oldest unblocked routable packet stored in the ingress port 115 based on the enqueue records stored in the enqueue queue 410 of the enqueue module 140 corresponding to the ingress port 115 and the set of ordering rules implemented by the packet switch 105.

In some embodiments, the enqueue controller 400 identifies a packet stored in the ingress port 115 as an unblocked packet based on a packet type flag, a port map, and a credit state in the enqueue record corresponding to the packet. For example, the packet type flag may indicate the packet is a posted packet, the port map may identify a destination egress port 125 of the packet, and the credit state may indicate a number of credits requested for routing the packet of the packet type to the egress port 125. Further in this example, the port state of the destination egress port 125 may indicate that the egress port 125 has available storage capacity for storing the packet and has issued sufficient credits for the packet. In these embodiments, the enqueue controller 400 determines based on both the port map and credit state of the enqueue record and the port state of the destination egress port 125 whether the destination egress port 125 is able to accept the packet. If the enqueue controller 400 determines that the destination egress port 125 of the packet is able to accept the packet, the packet is deemed to be an unblocked packet. Otherwise, the packet is deemed to be a blocked packet.

In some embodiments, the enqueue controller 400 identifies a packet stored in the ingress port 115 as a routable packet based on both the packet type flag and the pass flag in the enqueue record corresponding to the packet and the set of ordering rules implemented by the packet switch 105. For example, the packet type flag may indicate the packet is a posted packet and the pass flag may indicate that the permissive pass rule is applicable to the packet. In these embodiments, the enqueue controller 400 may determine that the packet (i.e., a subsequent transaction) is allowed to pass an older packet stored in the ingress port 115 (i.e., a previous transaction) based on the pass flag and the packet type flag of the enqueue record corresponding to the packet of the previous transaction, the packet type flag of the enqueue record corresponding to the packet of the subsequent transaction, and the set of ordering rules. Moreover, if the enqueue controller 400 determines that the packet of the subsequent transaction is allowed to pass each older packet stored in the ingress port 115 (e.g., previous transactions), the packet of the subsequent transaction is deemed to be a routable packet. The method 500 then proceeds to step 590.

In step 590, the oldest unblocked routable packet stored in the ingress port is selected for routing ahead of the blocked packet based on the identified enqueue records. In various embodiments, the enqueue controller 400 selects the oldest unblocked routable packet stored in the ingress port 115 for routing ahead of the blocked packet based on the identified enqueue records. For example, the enqueue controller 400 may select the oldest unblocked routable packet for routing in the next routing cycle of the packet switch 105 and subsequently select the blocked packet for routing when the blocked packet becomes unblocked. The step 540 of the method 500 then ends. In various embodiments, the method 500 proceeds to step 545 after step 590.

In various embodiments, the step 540 of the method 500 may include more or fewer than the steps 580-590 illustrated in FIG. 5C and described above. In some embodiments, the steps 580-590 of the method 500 may be performed in a different order than the order illustrated in FIG. 5C and described above. In some embodiments, some of the steps 580-590 of the method 500 may be performed in parallel or substantially simultaneously. For example, all of the steps 580-590 may be performed in parallel or substantially simultaneously in a combinational logic circuit. In various embodiments, one or more of the steps 580-590 may be performed more than once in the method 500.

Figure 6A:
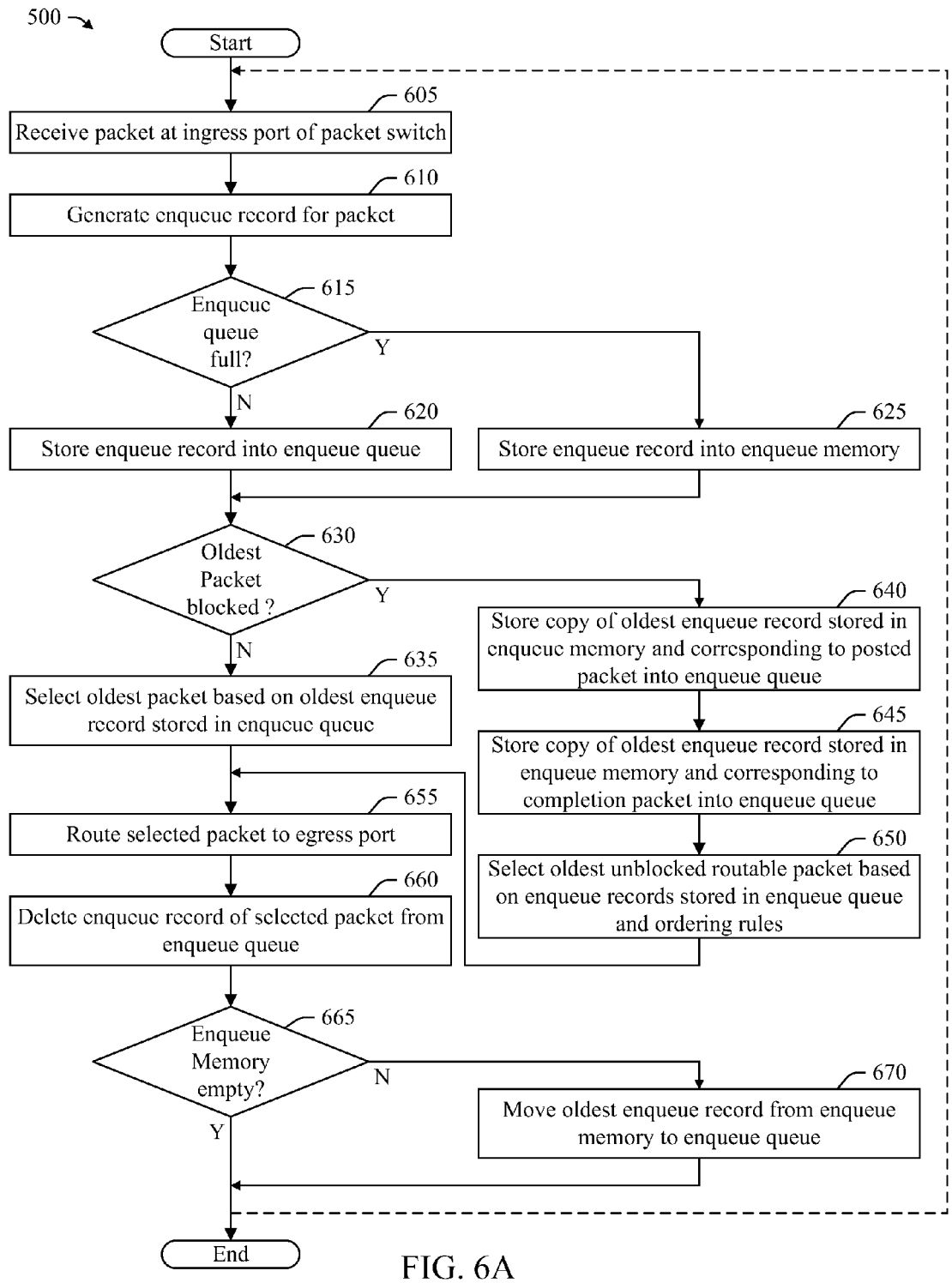
FIG. 6A is a flow chart of a method of routing packets through a packet switch, in accordance with an embodiment of the present invention.

FIG. 6A illustrates the method 500 of routing packets through a packet switch, in accordance with an embodiment of the present invention. In step 605, a packet is received at an ingress port of the packet switch. In various embodiments, an ingress port 115 receives a packet from the link partner 110 corresponding to the ingress port 115 and stores the packet. The method 500 then proceeds to step 610.

In step 610, an enqueue record is generated for the packet. In various embodiments, the ingress port 115 storing the packet generates a corresponding enqueue record for the packet. Moreover, the enqueue record includes a pass flag indicating whether the corresponding packet is permitted to be routed through the packet switch 105 ahead of another packet already stored in the ingress port (i.e., a preceding packet) based on a permissive passing rule of a set of ordering rules implemented by the packet switch 105. The method 500 then proceeds to step 615.

In step 615, a determination is made as to whether the enqueue queue 410 is full. In various embodiments, the enqueue controller 400 determines whether the enqueue 410 is full (i.e., filled to capacity). If the enqueue queue 410 is not full, the method 500 proceeds to step 620. Otherwise, the method 500 proceeds to step 625

In step 620, arrived at from the determination in step 615 that the enqueue queue is not full, the enqueue record is stored into enqueue queue. In various embodiments, the enqueue controller 400 stores the enqueue record into the enqueue queue 410 based on a sequential order in which packets are received at the ingress port 115. In this way, older enqueue records are stored in the enqueue queue 410 before newer enqueue records are stored in the enqueue queue 410. The method 500 then proceeds to step 630.

In step 625, arrived at from the determination in step 615 that the enqueue queue is full, the enqueue record is stored into the enqueue memory 415. In various embodiments, the enqueue controller 400 stores the enqueue record into the enqueue memory 415 based on the sequential order in which packets are received at the ingress port 115. In this way, older enqueue records are stored in enqueue memory 415 before newer enqueue records are stored in the enqueue memory 415. The method 500 then proceeds to step 630.

In step 630, arrived at from step 620 in which the enqueue record is stored into the enqueue queue 410 or from step 625 in which the enqueue record is stored into the enqueue memory 415, it is determined whether the oldest packet stored in the ingress port is blocked. In various embodiments, the enqueue controller 400 determines whether the oldest packet stored in the ingress port 115 is blocked based on the oldest enqueue record stored in the enqueue queue 410. For example, the enqueue controller 400 may identify the enqueue record stored at the head of the enqueue queue 410 as the oldest enqueue record stored in the enqueue queue 410. Further in this example, the enqeueue controller 400 may determine based on the enqueue record stored at the head of the enqueue queue 410 whether the oldest packet stored in the ingress port 115 is blocked. The method 500 then proceeds to step 635.

In step 635, the oldest packet is selected based on the oldest enqueue record stored in the enqueue queue. In various embodiments, the enqueue controller 400 selects the oldest packet stored in the ingress port 115 based on the oldest enqueue record stored in the enqueue queue 410, which identifies the oldest packet stored in the ingress port 115. The method 500 then proceeds to step 640.

In step 640, a copy of the oldest enqueue record stored in enqueue memory and corresponding to posted packet is stored into the enqueue queue. In various embodiments, the enqueue controller 400 stores a copy of the oldest enqueue record stored in the enqueue memory 415 and corresponding to a posted packet into the enqeueue queue 410. For example, the enqueue controller 400 may identify the oldest enqueue record stored in the enqueue memory 415 and corresponding to a posted packet based on the enqueue memory index queue 420. Further in this example, the enqueue controller 400 stores a copy of the oldest enqueue record stored in the enqueue memory 415 and corresponding to a posted packet into a dedicated storage unit of the enqueue queue 410 located at a tail of the enqueue queue 410. In this way, the enqueue records stored in the enqueue queue 410 are in sequential order according to age and the oldest enqueue record is stored at the head of the enqueue queue 410. The method 500 then proceeds to step 645.

In step 645, a copy of the oldest enqueue record stored in enqueue memory and corresponding to completion packet is stored into the enqueue queue. In various embodiments, the enqueue controller 400 stores a copy of the oldest enqueue record stored in the enqueue memory 415 and corresponding to a completion packet into the enqeueue queue 410. For example, the enqueue controller 400 may identify the oldest enqueue record stored in the enqueue memory 415 and corresponding to a completion packet based on the enqueue memory index queue 420. Further in this example, the enqueue controller 400 stores a copy of the oldest enqueue record stored in the enqueue memory 415 and corresponding to a completion packet into a dedicated storage unit of the enqueue queue 410 located at a tail of the enqueue queue 410. In this way, the enqueue records stored in the enqueue queue 410 are in sequential order according to age and the oldest enqueue record is stored at the head of the enqueue queue 410. The method 500 then proceeds to step 650.

In step 650, an oldest unblocked routable packet is selected based on the enqueue records stored in enqueue queue 410 and the set of ordering rules. In various embodiments, the enqueue controller 400 selects the oldest unblocked routable packet stored in the ingress port 115 based on the enqueue records stored in the enqueue queue 410 and the set of ordering rules implemented by the packet switch 105. For example, enqueue queue 410 may include a fixed number of registers (e.g., storage units) for storing enqueue records and the enqueue controller 400 may include combinational logic for substantially simultaneously accessing the enqueue records stored in the enqueue queue 410, substantially simultaneously identifying any unblocked routable packets based on the enqueue records stored in the enqueue queue 410, and selecting the oldest unblocked routable packet.

In various embodiments, the combinational logic of the enqueue controller 400 determines whether a packet corresponding to an enqueue record stored in the enqueue queue 410 is a routable packet based on packet types of the packets corresponding to the enqueue records, which are identified in the enqueue records, pass flags in the enqueue records, and the set of ordering rules. Furthermore, the combinational logic of the enqueue controller 400 determines whether each of the routable packets is an unblocked packet based on a port map in the corresponding enqueue record, which identifies an egress port 125 as a destination egress port 125 of the packet, and a credit state in the corresponding record, which indicates a number of credits for routing the packet to the destination egress port 125 of the packet. The combinational logic of the enqueue controller 400 then identifies any packet that is a routable packet and an unblocked packet as an unblocked routable packet.

Because the enqueue queue 410 stores the oldest enqueue records that are stored in the enqueue structure 405 along with a copy of the oldest enqueue record stored in the enqueue memory 415 corresponding to a posted packet, and a copy of the oldest enqueue record stored in the enqueue memory 415 corresponding to a completion packet, the enqueue controller 400 is capable of determining the routing order for the packets stored in the corresponding ingress port 115 according to the set of ordering rules implemented by the packet switch 105 based on the enqueue records stored in the enqueue queue 410. Moreover, because the enqueue records are stored in registers (e.g., storage units) of the enqueue queue 410 and the combinational logic of the enqueue controller 400 simultaneously accesses the enqueue records stored in the enqueue queue 410, the enqueue controller 400 identifies the oldest unblocked routable packet stored in the ingress port 115 more quickly than other systems. The method 500 then proceeds to step 655.

In step 655, the selected packet is routed to an egress port. In various embodiments, the switch fabric 120 routes the selected packet to the destination egress port 115. The method 500 then proceeds to step 660.

In step 660, the enqueue record of the selected packet is deleted from the enqueue queue 410. In various embodiments, the enqueue controller 400 deletes the enqueue record corresponding to the selected packet from the enqueue queue 410. The method 500 then proceeds to step 665.

In step 665, it is determined whether the enqueue memory is empty. In various embodiments, the enqueue controller 400 determines whether the enqueue memory 415 is empty. For example, the enqueue controller 400 may determine whether the enqueue memory 415 is empty based on the enqueue memory index queue 420. The method 500 then proceeds to step 670.

In step 670, the oldest enqueue record is moved from enqueue memory to the enqueue queue. In various embodiments, the enqueue controller 400 moves the oldest enqueue record from the enqueue memory 415 to the enqueue queue 410. For example, the enqueue controller 400 may store a copy of the oldest enqueue record stored in the enqueue memory 415 into the enqueue queue 410 so that the enqueue records stored in the enqueue queue 410 are in sequential order according to age and the oldest enqueue record is stored at the head of the enqueue queue 410. The method 500 then proceeds to step 650. Additionally, the enqueue controller 400 deletes the oldest enqueue record stored in the enqueue memory 415. The method 500 then ends. Alternatively, the method 500 returns to step 605 after step 670.

In various embodiments, the method 500 may include more or fewer than the steps 605-670 illustrated in FIG. 6A and described above. In some embodiments, the steps 605-670 of the method 500 may be performed in a different order than the order illustrated in FIG. 6A and described above. In some embodiments, some of the steps 605-670 of the method 500 may be performed in parallel or substantially simultaneously. In various embodiments, one or more of the steps 605-670 may be performed more than once in the method 500.

Figure 6B:
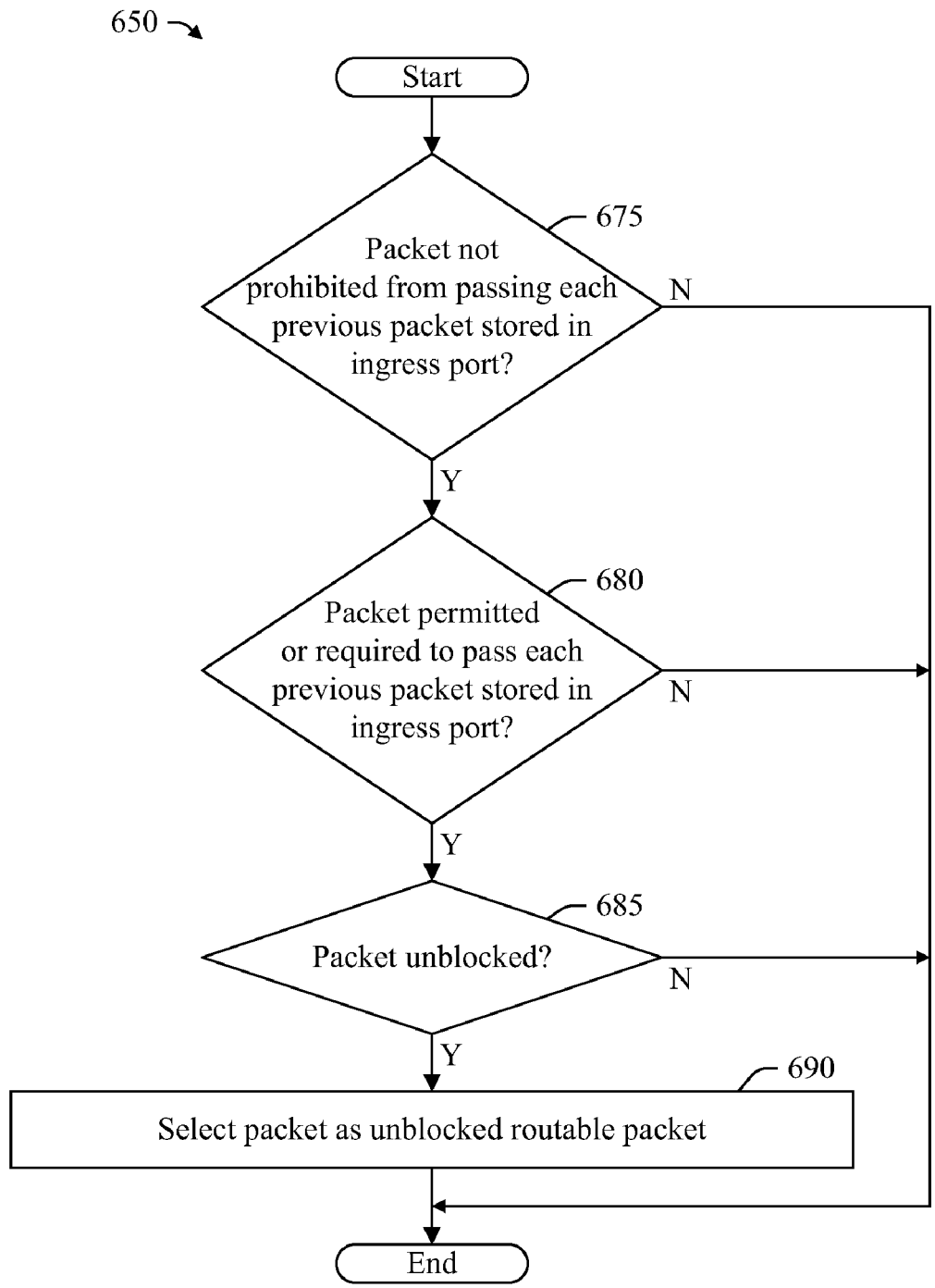
FIG. 6B is a flow chart of a portion of a method of routing packets through a packet switch, in accordance with an embodiment of the present invention.

FIG. 6B illustrates a portion of the method 500 of determining a routing order for routing the packets based on the enqueue records and the set of ordering rules. In this embodiment, the portion of the method 500 is an embodiment of the step 650 of the method 500 and is performed for each packet stored in the ingress port 115. In step 675, a determination is made as to whether a packet stored in the ingress port 115 is not prohibited from passing each previous packet stored in the ingress port 115. In various embodiments, the enqueue controller 400 determines whether the packet not prohibited from passing each previous packet stored in the ingress port 115 based on the packet type flag in the enqueue record of the packet, which is stored in the enqueue queue 410, the packet type flag of each older enqueue record stored in the enqueue queue 410, and the set or ordering rules implemented by the packet switch 105. For example, the enqueue controller 400 may include a combinational logic circuit to determine whether the packet is not prohibited from passing each previous packet stored in the ingress port 115 based on the enqueue records stored in the enqueue queue 410 and the set of ordering rules. If the packet is determined not to be prohibited from passing each previous packet stored in the ingress port 115, the method 500 proceeds to step 680. Otherwise the method 500 proceeds to step 655 after step 675.

In step 680, arrived at from the determination in step 675 that the packet is not prohibited from passing each previous packet stored in the ingress port 115, a determination is made as to whether the packet is permitted or required to pass each previous packet stored in the ingress port 115. In various embodiments, the enqueue controller 400 determines whether the packet permitted or required to pass each previous packet stored in the ingress port 115 based on the pass flag and the packet type flag in the enqueue record of the packet, which is stored in the enqueue queue 410, the packet type flag of each older enqueue record stored in the enqueue queue 410, and the set or ordering rules implemented by the packet switch 105. For example, the enqueue controller 400 may include a combinational logic circuit to determine whether the packet is permitted or required to pass each previous packet stored in the ingress port 115 based on the enqueue records stored in the enqueue queue 410 and the set of ordering rules. If the packet is determined to be permitted or required to pass each previous packet stored in the ingress port 115, the method 500 proceeds to step 685. Otherwise the method 500 proceeds to step 655 after step 580.

In step 685, arrived at from the determination in step 680 that the packet is permitted or required to pass each previous packet stored in the ingress port 115, a determination is made as to whether the packet is unblocked. In various embodiments, the enqueue controller 400 determines whether the packet is unblocked based on the port map and the credit state in the enqueue record of the packet, which is stored in the enqueue queue 410, and a port state indicating for each egress port 125 whether the egress port 125 is able to accept a packet. For example, the port state may indicate whether each egress port has storage capacity for storing a packet and credits advertised for the packet and the enqueue controller 400 may include a combinational logic circuit to determine whether the packet is unblocked based on the port map, the credit state, and the port state. If the packet is determined to be unblocked, the method 500 proceeds to step 690. Otherwise the method 500 proceeds to step 655 after step 685.

In step 690, arrived at from the step 685 in which the packet is determined to be unblocked, the packet is selected as an unblocked routable packet. The method 500 then proceeds to step 655.

In various embodiments, the step 650 of the method 500 may include more or fewer than the steps 675-690 illustrated in FIG. 6B and described above. In some embodiments, the steps 675-690 of the method 500 may be performed in a different order than the order illustrated in FIG. 6B and described above. In some embodiments, some of the steps 675-690 of the method 500 may be performed in parallel or substantially simultaneously. For example, all of the steps 675-690 may be performed in parallel or substantially simultaneously in a combinational logic circuit. In various embodiments, one or more of the steps 675-690 may be performed more than once in the method 500.

Figure 7A:
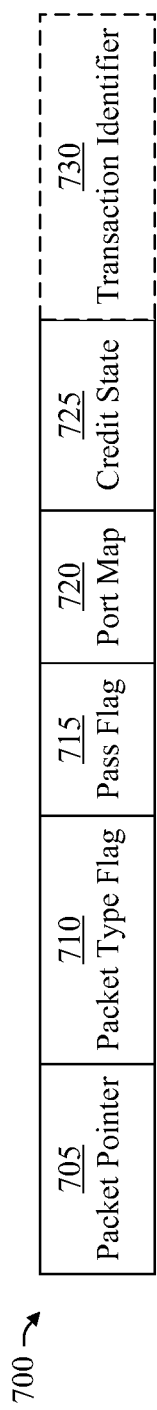
FIG. 7A is a block diagram of an enqueue record, in accordance with an embodiment of the present invention.

FIG. 7A illustrates an enqueue record 700, in accordance with an embodiment of the present invention. The enqueue record 700 includes a packet pointer 705, a packet type flag 710, a pass flag 715, a port map 720, a credit state 725, and an optional transaction identifier 730. The packet pointer 705 of the enqueue record 700 identifies a corresponding packet stored in an ingress port 115 of the packet switch 105. The packet type flag 710 of the enqueue record 700 identifies a type of the packet corresponding to the enqueue record 700 (i.e., a packet type). For example, the packet type may be posted request, a non-posted request, or a completion. In various embodiments, the packet type flag 710 includes one or more data bits for identifying the packet type of the packet identified by the packet pointer 705 in the enqueue record 700. In some embodiments, the packet type flag 710 has a one-hot encoding in which each data bit of the packet type flag 710 corresponds to a packet type and indicates whether the packet identified by the packet pointer 705 of the enqueue record 700 has the packet type.

The port map 720 identifies each egress port 125 that is a destination egress port 125 of the packet identified by the packet pointer 705 in the enqueue record 700 including the port map 720. For example, the port map 720 may identify a single egress port 125 as a destination egress port 125 for a unicast packet (i.e., a packet that has a single destination). As another example, the port map 720 may identify more than one of the egress ports 125 as a destination egress port 125 for a multicast packet (i.e., a packet that has more than one destination).

The credit state 725 indicates a number of credits for routing the packet identified by the packet pointer 705 to an egress port 125. In some embodiments, the packet type flag 710 in combination with the credit state 725 identifies both a number and type of credits for routing the packet identified by the packet pointer 705 to an egress port 125. For example, the packet type flag 710 may indicate that the packet identified by the packet pointer 705 is a posted request and the credit state 725 may indicate one header credit and one data credit for routing the packet to an egress port 125. In this example, the packet type flag 710 in combination with the credit state 725 indicate that one posted header credit and one posted data credit are requested for routing the packet identified by the packet pointer 705 to an egress port 125.

The transaction identifier 730 identifies a transaction for the packet identified by the packet pointer 705. In various embodiments, the transaction identifier 730 is based on a transaction identifier value in the packet header of the packet identified by the packet pointer 705. Moreover, the transaction identifier 730 may identify a transaction sequence for packets having the same transaction identifier value in the packet headers of the packets. In other embodiments, the ingress port 115 that generates the enqueue record 700 for the packet generates the transaction identifier 730, for example based on the contents of the packet.

In various embodiments, the ingress ports 115 generate the enqueue records 700 for corresponding packets stored in the ingress ports 115, and the packet switch 150 implements the basic ordering rules, the relaxed ordering rules, the identifier ordering rules, or the relaxed and identifier ordering rules, or some combination thereof. For example, the packet switch 105 may select one of the sets of ordering rules based on user input to the packet switch 105.

In various embodiments in which the enqueue records 700 include the transaction identifiers 730, the packet switch 105 implements a set of ordering rules, including some or all of the permissive passing rules for completion transactions. For example, the packet switch 105 may implement the basic ordering rules, including all of the permissive passing rules for completion transactions illustrated in Table 4. As another example, the packet switch 105 may implement the relaxed ordering rules, including all of the permissive passing rules for completion transactions illustrated in Table 8. As still another example, the packet switch 105 may implement the identification ordering rules, including all of the permissive passing rules for completion transactions illustrated in Table 12. As yet another example, the packet switch 105 may implement the relaxed and identifier ordering rules, including all of the permissive passing rules for completion transactions illustrated in Table 16.

In some embodiments, an ingress port 115 sets the pass flag 715 of the enqueue record 700 corresponding to a packet received by the ingress port 115 if the packet is an I/O write completion or a configuration write completion. In turn, the enqueue controller 400 allows the completion packet (i.e., a subsequent transaction) corresponding to the enqueue record 700 to pass a posted packet previously received by the ingress port 115 (i.e., a previous transaction) if the posted packet previously received by the ingress port 115 is blocked and the pass flag 715 of the enqueue record 700 is set.

In some embodiments, an ingress port 115 sets the pass flag 715 of the enqueue record 700 corresponding to a packet received by the ingress port 115 if the packet is a posted packet and has a relaxed ordering bit is set in the packet. In turn, the enqueue controller 400 allows the posted packet (i.e., a subsequent transaction) corresponding to the enqueue record 700 to pass a posted packet previously received by the ingress port 115 (i.e., a previous transaction) if the posted packet previous received by the ingress port 115 is blocked and the pass flag 715 of the enqueue record 700 is set.

In some embodiments, an ingress port 115 sets the pass flag 715 of the enqueue record 700 corresponding to a packet received by the ingress port 115 if the packet is a non-posted data packet and has a relaxed ordering bit is set in the packet. In turn, the enqueue controller 400 allows the non-posted data packet (i.e., a subsequent transaction) corresponding to the enqueue record 700 to pass a posted packet previously received by the ingress port 115 (i.e., a previous transaction) if the posted packet previous received by the ingress port 115 is blocked and the pass flag 715 of the enqueue record 700 is set.

In some embodiments, an ingress port 115 sets the pass flag 715 of the enqueue record 700 corresponding to a packet received by the ingress port 115 if the packet is a posted packet and has an identifier ordering bit is set in the packet. In turn, the enqueue controller 400 allows the posted packet (i.e., a subsequent transaction) corresponding to the enqueue record 700 to pass a posted packet previously received by the ingress port 115 (i.e., a previous transaction) if the posted packet previous received by the ingress port 115 is blocked, the pass flag 715 of the enqueue record 700 is set, and the transaction identifiers 730 in the enqueue records 700 of the packets (i.e., the previous transaction and the subsequent transaction) are different from each other.

In some embodiments, an ingress port 115 sets the pass flag 715 of the enqueue record 700 corresponding to a packet received by the ingress port 115 if the packet is a non-posted read packet and has an identifier ordering bit is set in the packet. In turn, the enqueue controller 400 allows the non-posted read packet (i.e., a subsequent transaction) corresponding to the enqueue record 700 to pass a posted packet previously received by the ingress port 115 (i.e., a previous transaction) if the posted packet previous received by the ingress port 115 is blocked, the pass flag 715 of the enqueue record 700 is set, and the transaction identifiers 730 in the enqueue records 700 of the packets (i.e., the previous transaction and the subsequent transaction) are different from each other.

In some embodiments, an ingress port 115 sets the pass flag 715 of the enqueue record 700 corresponding to a packet received by the ingress port 115 if the packet is a posted packet and has an identifier ordering bit or a relaxed ordering bit is set in the packet, or both. In these embodiments, the pass flag 715 may include more than one data bit to distinguish whether the relaxed ordering bit or the identifier ordering bit, or both, as set in the packet. In turn, the enqueue controller 400 allows the posted packet (i.e., a subsequent transaction) corresponding to the enqueue record 700 to pass a posted packet previously received by the ingress port 115 (i.e., a previous transaction) if the posted packet previous received by the ingress port 115 is blocked and the pass flag 715 of the enqueue record 700 is set to indicate that the relaxed ordering bit is set. Additionally, the enqueue controller 400 allows the posted packet (i.e., a subsequent transaction) corresponding to the enqueue record 700 to pass a posted packet previously received by the ingress port 115 (i.e., a previous transaction) if the posted packet previous received by the ingress port 115 is blocked, the pass flag 715 of the enqueue record 700 is set to indicate that the relaxed ordering bit is set, and the transaction identifiers 730 in the enqueue records 700 of the packets (i.e., the previous transaction and the subsequent transaction) are different from each other.

In various embodiments, the enqueue controller 400 includes a combinational logic circuit for selecting the oldest unblocked routable packet stored in the ingress port 115 based on the enqueue records 700 stored in the enqueue queue 410. In this way, the enqueue controller 400 implements the set of ordering rules and determines the routing order for the packets stored in the ingress port 115. Moreover, because the enqueue controller 400 includes the combinational logic circuit for selecting the oldest unblocked packet stored in the ingress port 115 based on the enqueue records 700 stored in the enqueue queue 410, the enqueue controller 400 determines the routing order for the packets more quickly than systems that do not include the enqueue structure 405 and the combinational logic circuit of the enqueue controller 400. As a result, packet throughput is increased in the packet switch 105 as compared to systems that do not include the enqueue structure 405 and the combinational logic circuit of the enqueue controller 400.

Figure 7B:
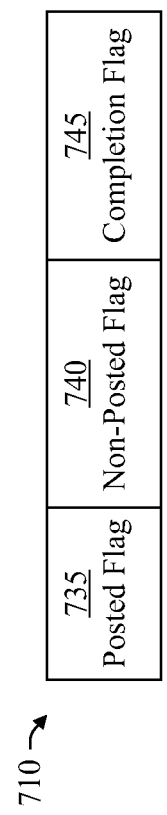
FIG. 7B is a block diagram of a packet type flag, in accordance with an embodiment of the present invention.

FIG. 7B illustrates the packet type flag 710, in accordance with an embodiment of the present invention. In this embodiment, the packet type flag 710 includes three data bits having a one-hot encoding for indicating whether the packet identified by the packet pointer 705 of the enqueue record 700 is a posted request (i.e., a posted packet), a non-posted request (i.e., a non-posted read packet or a non-posted data packet), or a completion (i.e., a completion packet). As illustrated in FIG. 7B, the packet type flag 710 includes a posted flag 735, a non-posted flag 740, and a completion flag 745. The posted flag 735 of the packet type flag 710 indicates whether the packet identified by the packet pointer 705 of the enqueue record 700 containing the packet type flag 710 is a posted request. The non-posted flag 740 of the packet type flag 710 indicates whether the packet identified by the packet pointer 705 of the enqueue record 700 containing the packet type flag 710 is a non-posted read request or a non-posted data request.

The completion flag 745 of the packet type flag 710 indicates whether the packet identified by the packet pointer 705 of the enqueue record 700 containing the packet type flag 710 is a completion.

Figure 7C:
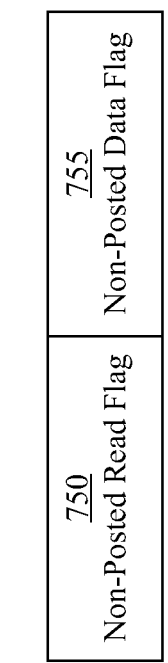
FIG. 7C is a block diagram of a non-posted flag, in accordance with an embodiment of the present invention.

FIG. 7C illustrates the non-posted flag 740, in accordance with an embodiment of the present invention. In this embodiment, the non-posted flag 740 includes two data bits and has a one-hot encoding for distinguishing between a non-posted read request and a non-posted data request. As illustrated in FIG. 7C, the non-posted flag 740 includes a non-posted read flag 750 for indicating whether the packet identified by the packet pointer 705 of the enqueue record 700 is a non-posted read request (i.e., a non-posted read packet). Additionally, the non-posted flag 740 includes a non-posted data flag 755 for indicating whether the packet identified by the packet pointer 705 of the enqueue record 700 is a non-posted data request (i.e., a non-posted data packet). Moreover, the packet type flag 710 includes four bit and has a one-hot encoding for indicating whether the packet identified by the packet pointer 705 of the enqueue record 700 is a posted request, a non-posted read request, a non-posted data request, or a completion.

Figure 8:
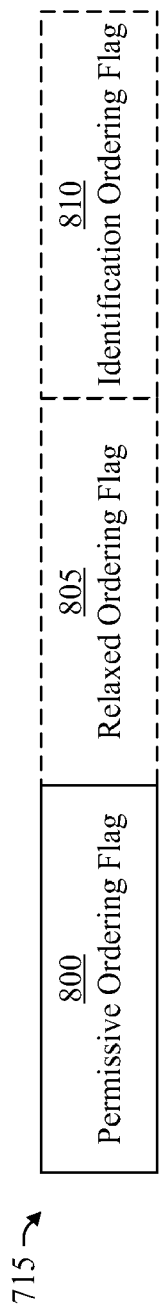
FIG. 8 is a block diagram of a pass flag, in accordance with an embodiment of the present invention.

FIG. 8 illustrates the pass flag 715, in accordance with an embodiment of the present invention. The pass flag 715 includes a permissive ordering flag 800, an optional relaxed ordering flag 805, and an optional identifier ordering flag 810. The permissive ordering flag 800 indicates whether one or more permissive passing rules of a set of ordering rules is permitted for the packet identified by the packet pointer 705 in the enqueue record 700 containing the pass flag 715. For example, the permissive ordering flag 800 may indicate whether an I/O write completion or a configuration write completion may pass a posted request. The relaxed ordering flag 805 indicates whether a relaxed ordering bit is set in the packet identified by the packet pointer 705 in the enqueue record 700. The identifier ordering flag 810 indicates whether an identifier ordering bit is set in the packet identified by the packet pointer 705 in the enqueue record 700.

In various embodiments, each of the permissive ordering flag 800, the relaxed ordering flag 805, and the identifier ordering flag 810 is a data bit in the pass flag 715. In other embodiments, the pass flag 715 may include more or fewer than three data bits. For example, the pass flag 715 may include one data bit or two data bits encoded to indicate whether one or more permissive passing rules of a set of ordering rules is permitted for the packet identified by the packet pointer 705 in the enqueue record 700, whether a relaxed ordering bit is set in the packet, and whether an identifier ordering bit is set in the packet.

Figure 9:
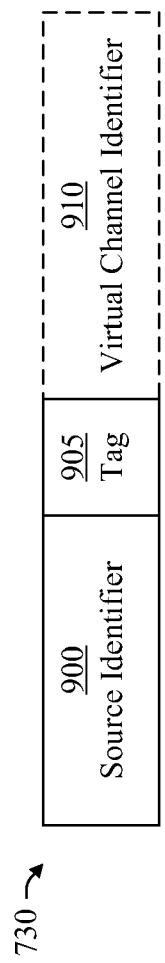
FIG. 9 is a block diagram of a transaction identifier, in accordance with an embodiment of the present invention.

FIG. 9 illustrates the transaction identifier 730, in accordance with an embodiment of the present invention. The transaction identifier 730 includes a source identifier 900, a tag 905, and an optional virtual channel identifier 910. The source identifier 900 identifies a requester or a completer for the transaction including the packet identified by the packet pointer 705 in the enqueue record 700 containing the transaction identifier 730.

For example, the packet identified by the packet pointer 705 in the enqueue record 700 may be a posted packet or a non-posted packet. In this example, the source identifier 900 may be a requester identifier that identifies a requester that initiated the transaction (e.g., a link partner 110). As another example, the packet identified by the packet pointer 705 in the enqueue record 700 may be a completion packet. In this example, the source identifier 900 may be a completer identifier that identifies a completer of the transaction for the completion packet (e.g., a link partner 110). In various embodiments, the source identifier 900 identifies a bus number, a device number or a function of the requester, or some combination thereof.

The tag 905 is an identifier (e.g., a number) assigned to a given non-posted request to distinguish completions for the non-posted request from other requests. In various embodiments, the requester that generates a non-posted request assigns the tag 905 to the non-posted request. Generally, the tag 905 uniquely identifies a transaction that is outstanding in the communication system 100 (e.g., a transaction that has not been terminated, completed, or discarded).

The virtual channel identifier 910 identifies one or more traffic classes for the packet identified by the packet pointer 705 in the enqueue record 700. In various embodiments, an ingress port 115 assigns a packet to a virtual channel based on a traffic class label in the packet and sets the virtual channel identifier 910 in the enqueue record 700 of the packet to identify the virtual channel. Moreover, the ingress port 115 may assign more than one traffic class to the same virtual channel.

Figure 10:
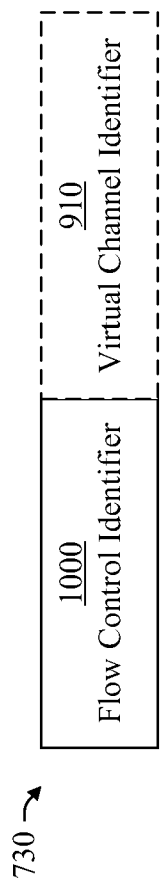
FIG. 10 is a block diagram of a transaction identifier, in accordance with an embodiment of the present invention.

FIG. 10 illustrates the transaction identifier 730, in accordance with an embodiment of the present invention. The transaction identifier 730 includes a flow control identifier 1000. The flow control identifier 1000 identifies a packet flow through the packet switch 105, which may include one or more transactions. In various embodiments, an ingress port 115 generates the flow control identifier 1000 in an enqueue record 700 for a packet received by the ingress port 115. In some embodiments, the ingress port 115 generates the flow control identifier 1000 for a packet by performing a hash function on data in the packet, such as a transaction identifier 730 in a packet header of the packet.

In some embodiments, the flow control identifier 1000 has a number of data bits that is fewer than the number of data bits in a source identifier 900. In some embodiments, the flow control identifier 1000 has a number of data bits that is fewer that the sum of the number of data bits in a source identifier 900 and a tag 905. In this way, the flow control identifier 1000 distinguishes between packet flows but includes fewer data bits than are required to distinguish between transactions. As a result, size of the enqueue record 700 is reduced. Moreover, size and power consumption of the enqueue module 140 are reduced because size and power consumption of the enqueue queue 410, the enqueue memory 415, and the enqueue memory index queue 420 are reduced.

In various embodiments, the packet switch 105 sets the flow control identifiers 1000 in the enqueue records 700 to partially implement some or all of the permissive passing rules of the set of identifier ordering rules. In these embodiments, the packet switch 105 selects the flow control identifiers 1000 to prevent deadlock and inconsistent data from occurring in a distributed producer-consumer ordering model for the communication system 100. For example, the packet switch 105 may select the flow control identifiers 1000 based on input (e.g., user input) to the packet switch 105.

Embodiments Implementing the Basic Ordering Rules

In some embodiments in which the packet switch 105 implements the basic ordering rules, an ingress port 115 receives a packet and sets the pass flag 715 in the enqueue record 700 of the packet if the packet is an I/O write completion or a configuration write completion. In these embodiments, the pass flag 715 may be a single data bit. In turn, the enqueue controller 400 allows a completion packet (i.e., a subsequent transaction) corresponding to the enqueue record 700 to pass a posted packet (i.e., a previous transaction) if the pass flag 715 in the enqueue record 700 is set. In this way, the enqueue controller 400 allows an I/O write completion or a configuration write completion subsequently received by the ingress port 115 to be routed to an egress port 125 before a posted request previously received by the ingress port 115 is routed to an egress port 125, if the pass flag 715 in the enqueue record 700 is set.

In further embodiments, the enqueue controller 400 allows a non-posted read request (i.e., a subsequent transaction) corresponding to the enqueue record 700 to pass a non-posted data request or another non-posted read request (i.e., a previous transaction) regardless of the pass flag 715 in the enqueue record 700. In some further embodiments, the enqueue controller 400 allows a non-posted data request (i.e., a subsequent transaction) corresponding to the enqueue record 700 to pass a non-posted read request or another non-posted data request (i.e., a previous transaction) regardless of the pass flag 715 in the enqueue record 700.

In some embodiments in which the enqueue records 700 do not include transaction identifiers 730, the packet switch 105 does not implement the permissive passing rules for completion transactions in the basic set of ordering rules. In these embodiments, the enqueue controller 400 does not allow a completion transaction to pass another completion transaction. In this way, the packet switch 105 partially implements the permissive passing rules of the set of basic ordering rules.

In some embodiments in which the enqueue record 700 does not include a transaction identifier 730, the enqueue controller 400 allows a completion to pass another completion if the egress ports 125 indicated in the port maps 720 of the enqueue records 700 for the completion transactions are disjoint (i.e., have not ports in common). In this way, the enqueue controller 400 partially implements the permissive passing rules of the set of basic ordering rules.

In further embodiments, completions require the same number of issued credits to be routed from an ingress port 115 to the egress port 125. For example, completions may require a header credit but not require a data credit to be routed from an ingress port 115 to an egress port 125. As a result, if an egress port 125 has issued sufficient credits for a completion to be routed to the egress port 125, completions stored in an ingress port 115 that are to be routed to the egress port 125 will either all be blocked or will all be unblocked in a scheduling cycle. In these embodiments, the enqueue controller 400 fully implements the set of basic ordering rules including all of the permissive passing rules of the set of basic ordering rules without requiring transaction identifiers 730 in the enqueue records 700.

Embodiments Implementing the Relaxed Ordering Rules

In some embodiments in which the packet switch 105 implements the relaxed ordering rules, an ingress port 115 receives a packet and sets the pass flag 715 in the enqueue record 700 of the packet if the packet is a posted packet and has a relaxed ordering bit set in the packet. For example, the packet may have a relaxed ordering bit set in the header of the posted packet. In these embodiments, the pass flag 715 may be a single data bit. In turn, the enqueue controller 400 allows a posted packet (i.e., a subsequent transaction) corresponding to the enqueue record 700 to pass a posted packet (i.e., a previous transaction) if the pass flag 715 in the enqueue record 700 is set. Additionally, the ingress port 115 sets the pass flag 115 in the enqueue record 700 if the packet received by the ingress port 115 is a non-posted data request and has a relaxed ordering bit set in the packet. In turn, the enqueue controller 400 allows a non-posted data packet (i.e., a subsequent transaction) corresponding to the enqueue record 700 to pass a posted packet (i.e., a previous transaction) if the pass flag 715 in the enqueue record 700 is set.

Additionally, the ingress port 115 sets the pass flag 715 of the enqueue record 700 if the packet is an I/O write completion or a configuration write completion. In turn, the enqueue controller 400 allows a completion packet (i.e., a subsequent transaction) corresponding to the enqueue record 700 to pass a posted packet (i.e., a previous transaction) if the pass flag 715 in the enqueue record 700 is set. In this way, the enqueue controller 400 allows an I/O write completion or a configuration write completion to pass a posted request if the pass flag 715 in the enqueue record 700 is set.

In further embodiments, the enqueue controller 400 allows a non-posted read request (i.e., a subsequent transaction) corresponding to the enqueue record 700 to pass a non-posted data request or another non-posted read request (i.e., a previous transaction) regardless of the pass flag 715 in the enqueue record 700. In some further embodiments, the enqueue controller 400 allows a non-posted data request (i.e., a subsequent transaction) corresponding to the enqueue record 700 to pass a non-posted read request or another non-posted data request (i.e., a previous transaction) regardless of the pass flag 715 in the enqueue record 700.

In embodiments in which the enqueue record 700 includes a transaction identifier 730, the packet switch 105 may implement all of the permissive passing rules of the relaxed set of ordering rules. In embodiments in which the enqueue record 700 does not include a transaction identifier 730, the packet switch 105 may implement some or all of the permissive passing rules of the relaxed set of ordering rules for completion transactions, as described more fully herein in relation to the basic ordering rules.

Embodiments Implementing the Identifier Ordering Rules

In some embodiments in which the packet switch 105 implements the identifier ordering rules, an ingress port 115 receives a packet and sets the pass flag 715 in the enqueue record 700 of the packet if the packet is a posted packet and has an identifier ordering bit set in the packet. For example, the posted packet may have an identifier ordering bit set in the header of the posted packet. In these embodiments, the pass flag 715 may be a single data bit. In turn, the enqueue controller 400 allows a posted packet (i.e., a subsequent transaction) corresponding to the enqueue record 700 to pass a posted packet (i.e., a previous transaction) if the pass flag 715 in the enqueue record 700 is set and the transactions identifiers 730 in the enqueue records 700 of the posted packets are different from each other.

Additionally, the ingress port 115 sets the pass flag 115 in the enqueue record 700 if the packet received by the ingress port 115 is a non-posted data request and has an identifier ordering bit set in the packet. In turn, the enqueue controller 400 allows a non-posted data packet (i.e., a subsequent transaction) corresponding to the enqueue record 700 to pass a posted packet (i.e., a previous transaction) if the pass flag 715 in the enqueue record 700 is set and the transaction identifiers 730 in the enqueue records 700 of the packets are different from each other.

Additionally, the ingress port 115 sets the pass flag 715 of the enqueue record 700 if the packet is an I/O write completion or a configuration write completion. In turn, the enqueue controller 400 allows a completion packet (i.e., a subsequent transaction) corresponding to the enqueue record 700 to pass a posted packet (i.e., a previous transaction) if the pass flag 715 in the enqueue record 700 is set. In this way, the enqueue controller 400 allows an I/O write completion or a configuration write completion to pass a posted request if the pass flag 715 in the enqueue record 700 is set.

In some further embodiments, the enqueue controller 400 allows a non-posted read request (i.e., a subsequent transaction) corresponding to the enqueue record 700 to pass a non-posted data request or another non-posted read request (i.e., a previous transaction) regardless of the pass flag 715 in the enqueue record 700. In other further embodiments, the enqueue controller 400 allows a non-posted data request (i.e., a subsequent transaction) corresponding to the enqueue record 700 to pass a non-posted read request or another non-posted data request (i.e., a previous transaction) regardless of the pass flag 715 in the enqueue record 700. In some further embodiments, the enqueue controller 400 allows a non-posted request (i.e., a subsequent transaction) corresponding to the enqueue record 700 to pass another non-posted request (i.e., a previous transaction) regardless of the pass flag 715 in the enqueue record 700 or the type of the non-posted request (e.g., non-posted data request or non-posted read request).

In embodiments in which the enqueue record 700 includes a transaction identifier 730, the packet switch 105 may implement all of the permissive passing rules of the identifier set of ordering rules. In embodiments in which the enqueue record 700 does not include a transaction identifier 730, the packet switch 105 may implement some or all of the permissive passing rules of the identifier set of ordering rules for completion transactions, as described more fully herein in relation to the basic ordering rules.

Embodiments Implementing the Relaxed and Identifier Ordering Rules

In some embodiments in which the packet switch 105 implements the relaxed and identifier ordering rules, an ingress port 115 receives a packet and sets the pass flag 715 in the enqueue record 700 of the posted packet if the packet is a posted packet and has an identifier ordering bit set in the packet. For example, the posted packet may have an identifier ordering bit set in the header of the posted packet. Additionally, the ingress port 115 sets the pass flag 715 in the enqueue record 700 of the posted packet if the packet is a posted packet and has a relaxed ordering bit set in the packet. In these embodiments, the pass flag 715 may be a single data bit or may include two data bits. Moreover, the enqueue controller 400 allows a posted packet (i.e., a subsequent transaction) corresponding to the enqueue record 700 to pass a posted packet (i.e., a previous transaction) if the pass flag 715 in the enqueue record 700 is set to indicate the relaxed ordering bit is set in the packet identified by the enqueue record 700. Additionally, the enqueue controller 400 allows a posted packet (i.e., a subsequent transaction) corresponding to the enqueue record 700 to pass a posted packet (i.e., a previous transaction) if the pass flag 715 in the enqueue record 700 is set to indicate that the identifier ordering bit is set in the packet identified by the enqueue record 700 and the transactions identifiers 730 in the enqueue records 700 of the posted packets are different from each other.

Additionally, the ingress port 115 sets the pass flag 115 in the enqueue record 700 if the packet received by the ingress port 115 is a non-posted data request and has a relaxed ordering bit set in the packet. In turn, the enqueue controller 400 allows a non-posted data packet (i.e., a subsequent transaction) corresponding to the enqueue record 700 to pass a posted packet (i.e., a previous transaction) if the pass flag 715 in the enqueue record 700 is set. Further, the ingress port 115 sets the pass flag 115 in the enqueue record 700 if the packet received by the ingress port 115 is a non-posted data request and has an identifier ordering bit set in the packet. In turn, the enqueue controller 400 allows a non-posted data packet (i.e., a subsequent transaction) corresponding to the enqueue record 700 to pass a posted packet (i.e., a previous transaction) if the pass flag 715 in the enqueue record 700 is set and the transaction identifiers 730 in the enqueue records 700 of the packets are different from each other.

Additionally, the ingress port 115 sets the pass flag 715 of the enqueue record 700 if the packet is an I/O write completion or a configuration write completion. In turn, the enqueue controller 400 allows a completion packet (i.e., a subsequent transaction) corresponding to the enqueue record 700 to pass a posted packet (i.e., a previous transaction) if the pass flag 715 in the enqueue record 700 is set. In this way, the enqueue controller 400 allows an I/O write completion or a configuration write completion to pass a posted request if the pass flag 715 in the enqueue record 700 is set.

In some further embodiments, the enqueue controller 400 allows a non-posted read request (i.e., a subsequent transaction) corresponding to the enqueue record 700 to pass a non-posted data request or another non-posted read request (i.e., a previous transaction) regardless of the pass flag 715 in the enqueue record 700. In other further embodiments, the enqueue controller 400 allows a non-posted data request (i.e., a subsequent transaction) corresponding to the enqueue record 700 to pass a non-posted read request or another non-posted data request (i.e., a previous transaction) regardless of the pass flag 715 in the enqueue record 700. In some further embodiments, the enqueue controller 400 allows a non-posted request (i.e., a subsequent transaction) corresponding to the enqueue record 700 to pass another non-posted request (i.e., a previous transaction) regardless of the pass flag 715 in the enqueue record 700 or the type of the non-posted request (e.g., non-posted data request or non-posted read request).

In embodiments in which the enqueue record 700 includes a transaction identifier 730, the packet switch 105 may implement all of the permissive passing rules of the identifier set of ordering rules. In embodiments in which the enqueue record 700 does not include a transaction identifier 730, the packet switch 105 may implement some or all of the permissive passing rules of the identifier set of ordering rules for completion transactions, as described more fully herein in relation to the basic ordering rules.

Posted Pass Flag Embodiments

Figures 11, 12, 13:
FIG. 11 is a block diagram of a pass flag, in accordance with an embodiment of the present invention.
FIG. 12 is a block diagram of an enqueue record, in accordance with an embodiment of the present invention.
FIG. 13 is a block diagram of an enqueue record, in accordance with an embodiment of the present invention.

FIG. 11 illustrates the pass flag 715, in accordance with an embodiment of the present invention. In this embodiment, the pass flag 715 is a posted pass flag 800 including a single data bit. Furthermore, the packet switch 105 implements all of the permissive passing rules of a set of ordering rules in which a subsequent request is permitted to pass a previous posted request but does not implement any other permissive passing rules. The packet switch 105 also implements the requisite passing rules and the prohibited passing rule of the set of ordering rules.

In one embodiment in which the pass flag 715 is a posted pass flag 800, the packet switch 105 implements the basic ordering rules. In this embodiment, an ingress port 115 sets the pass flag 715 in the enqueue record 700 of a packet received by the ingress port 115 if the packet is an I/O write completion or a configuration write completion. In turn, the enqueue controller 400 allows a completion packet (i.e., a subsequent transaction) corresponding to the enqueue record 700 to pass a posted packet (i.e., a previous transaction) if the pass flag 715 in the enqueue record 700 is set.

In this embodiment, the packet switch 105 implements all of the permissive passing rules of the set of basic ordering rules in which the previous request is a posted request but does not implement any other permissive passing rule of the set of basic ordering rules. Moreover, because the pass flag 715 is a single data bit in this embodiment, the number of data bits in the enqueue records 700 is reduced, which reduces size and power consumption of the packet switch 105 as compared to other embodiments of the packet switch 105.

In one embodiment in which the pass flag 715 is a posted pass flag 800, the packet switch 105 implements the relaxed ordering rules. In this embodiment, an ingress port 115 sets the pass flag 715 in the enqueue record 700 of the packet received by the ingress port 115 if the packet is an I/O write completion or a configuration write completion. In turn, the enqueue controller 400 allows a completion packet (i.e., a subsequent transaction) corresponding to the enqueue record 700 to pass a posted packet (i.e., a previous transaction) if the pass flag 715 in the enqueue record 700 is set. Additionally, the ingress port 115 sets the pass flag 115 of a packet received by the ingress port 115 if a relaxed ordering bit is set in the packet and the packet is a posted request or a non-posted data request. In turn, the enqueue controller 400 allows a posted request or a non-posted data request (i.e., a subsequent transaction) corresponding to the enqueue record 700 to pass a posted packet (i.e., a previous transaction) if the pass flag 715 in the enqueue record 700 is set.

In this embodiment, the packet switch 105 implements all of the permissive passing rules of the set of relaxed ordering rules in which the previous request is a posted request but does not implement any other permissive passing rule of the set of relaxed ordering rules. Moreover, because the pass flag 715 is a single data bit in this embodiment, the number of data bits in the enqueue records 700 is reduced, which reduces size and power consumption of the packet switch 105 as compared to other embodiments of the packet switch 105.

In one embodiment in which the pass flag 715 is a posted pass flag 800, the packet switch 105 implements the identifier ordering rules. In this embodiment, an ingress port 115 sets the pass flag 715 in the enqueue record 700 of the packet received by the ingress port 115 if the packet is an I/O write completion or a configuration write completion. In turn, the enqueue controller 400 allows a completion packet (i.e., a subsequent transaction) corresponding to the enqueue record 700 to pass a posted packet (i.e., a previous transaction) if the pass flag 715 in the enqueue record 700 is set.

Further in this embodiment, the ingress port 115 sets the pass flag 115 of a packet received by the ingress port 115 if an identifier ordering bit is set in the packet and the packet is a posted request or a non-posted data request. In turn, the enqueue controller 400 allows a posted request (i.e., a subsequent transaction) corresponding to the enqueue record 700 to pass a posted packet (i.e., a previous transaction) if the pass flag 715 in the enqueue record 700 is set and the transaction identifiers 730 of the posted packets are different in the enqueue records 700 of the posted packets. Additionally, the enqueue controller 400 allows a non-posted data request (i.e., a subsequent transaction) corresponding to the enqueue record 700 to pass a posted request (i.e., a previous transaction) if the pass flag 715 in the enqueue record 700 is set and the transaction identifiers 730 of the non-posted data request and the posted request are different in the enqueue records 700 from each other.

In this embodiment, the packet switch 105 implements all of the permissive passing rules of the set of identifier ordering rules in which the previous request is a posted request but does not implement any other permissive passing rule of the set of identifier ordering rules. Moreover, because the pass flag 715 is a single data bit in this embodiment, the number of data bits in the enqueue records 700 is reduced, which reduces size and power consumption of the packet switch 105 as compared to other embodiments of the packet switch 105.

FIG. 12 is a block diagram of the enqueue record 700, in accordance with an embodiment of the present invention. In this embodiment, the enqueue record 700 includes a packet pointer 705, a packet type flag 710, a posted packet flag 800, a port map 720, and a credit state 725. Moreover, the posted packet flag 800 is a single data bit and the packet switch 105 implements all of the permissive passing rules of a set of ordering rules in which a subsequent request is permitted to pass a previous posted request but does not implement any other permissive passing rules. For example, the set of ordering rules may be the set of basic ordering rules or the set of relaxed ordering rules.

FIG. 13 is a block diagram of the enqueue record 700, in accordance with an embodiment of the present invention. In this embodiment, the enqueue record 700 includes a packet pointer 705, a packet type flag 710, a posted packet flag 800, a port map 720, a credit state 725, and a flow control identifier 1000. Moreover, the posted packet flag 800 is a single data bit and the packet switch 105 implements all of the permissive passing rules of a set of ordering rules in which a subsequent request is permitted to pass a previous posted request but does not implement any other permissive passing rule. For example, the set of ordering rules may be the set of basic ordering rules or the set of relaxed ordering rules. Additionally, the packet switch 105 controls packet flow through the packet switch 105 based on the flow control identifiers 1000 in the enqueue records 700, as is described more fully herein.

Figure 14:
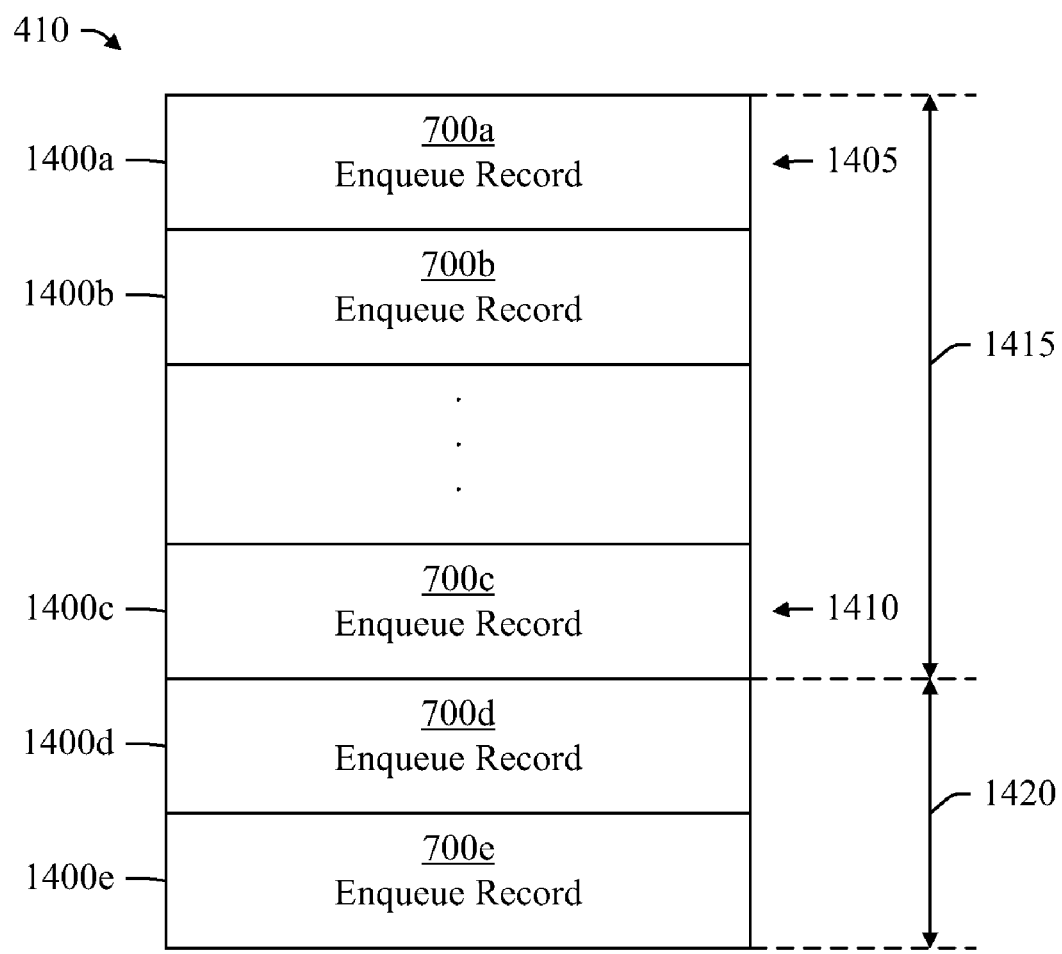
FIG. 14 is a block diagram of an enqueue queue, in accordance with an embodiment of the present invention.

FIG. 14 illustrates the enqueue queue 410, in accordance with an embodiment of the present invention. The enqueue queue 410 includes storage units 1400 (e.g., storage units 1400*a-e*) for storing enqueue records 700 (e.g., enqueue records 700*a-e*). Additionally, the enqueue queue 410 includes an ordered queue 1415 and a pair of dedicated storage units 1420. The ordered queue 1415 stores enqueue records 700 and maintains an order in which the enqueue records 700 are stored into the ordered queue 1415. For example, the ordered queue 1415 may be a first-in-first-out (FIFO) queue.

In some embodiments, the ordered queue 1415 includes a head 1405 and a tail 1410. In these embodiments, the head 1405 is a storage unit 1400 in the enqueue queue 410 for storing the enqueue record 700 of the oldest packet, if any, stored in the ingress port 115 corresponding to the enqueue queue 410. Moreover, the head 1405 of the ordered queue 1415 stores the oldest enqueue record 700, if any, stored in the ordered queue 1415. Further in these embodiments, the tail 1410 is a storage unit 1400 in the enqueue queue 410 for storing the newest enqueue record 700 stored in the ordered queue 1415.

The dedicated storage units 1420 are reserved for storing the enqueue records 700 corresponding to the oldest posted packet and the oldest completion packet stored in the corresponding ingress port 115. One of the dedicated storage units 1420 is a storage unit 1400 of the enqueue queue 410 reserved for storing the enqueue record 700 corresponding to the oldest posted packet, if any, stored in the ingress port 115 corresponding to the enqueue queue 410. The other dedicated storage unit 1420 is a storage unit 1400 of the enqueue queue 410 reserved for storing the enqueue record 700 corresponding to the oldest completion packet, if any, stored in the ingress port 115 corresponding to the enqueue queue 410.

In various embodiments, the enqueue controller 400 maintains the enqueue records 700 stored in the enqueue queue 410 in a sequential order in which the oldest enqueue record 700 stored in the enqueue queue 410 is stored at the head 1405 of the ordered queue 1415 followed by the remaining enqueue records 700 stored in the ordered queue 1415 according to the order in which the remaining enqueue records 700 are stored into the ordered queue 1415. Further, the enqueue records 700 stored in the dedicated storage units 1420, if any, are at the end of the sequential order following the newest enqueue record 700 stored in the ordered queue 1415 (e.g., the enqueue record 700 stored at the tail 1410 of the ordered queue 1415). If both of the dedicated storage units 1420 store an enqueue record 700, the last enqueue record 700 in the ordered sequence maintained by the enqueue controller 400 for the enqueue queue 410 is the oldest enqueue record 700 stored in the dedicated storage units 1420. In various embodiments, the enqueue controller 400 maintains a head pointer for identifying the storage unit 1400 containing the oldest enqueue record 700 in the enqueue queue 410 and a tail pointer for identifying the storage unit 1400 containing the oldest enqueue record 700 in the enqueue queue 410.

Figure 15:
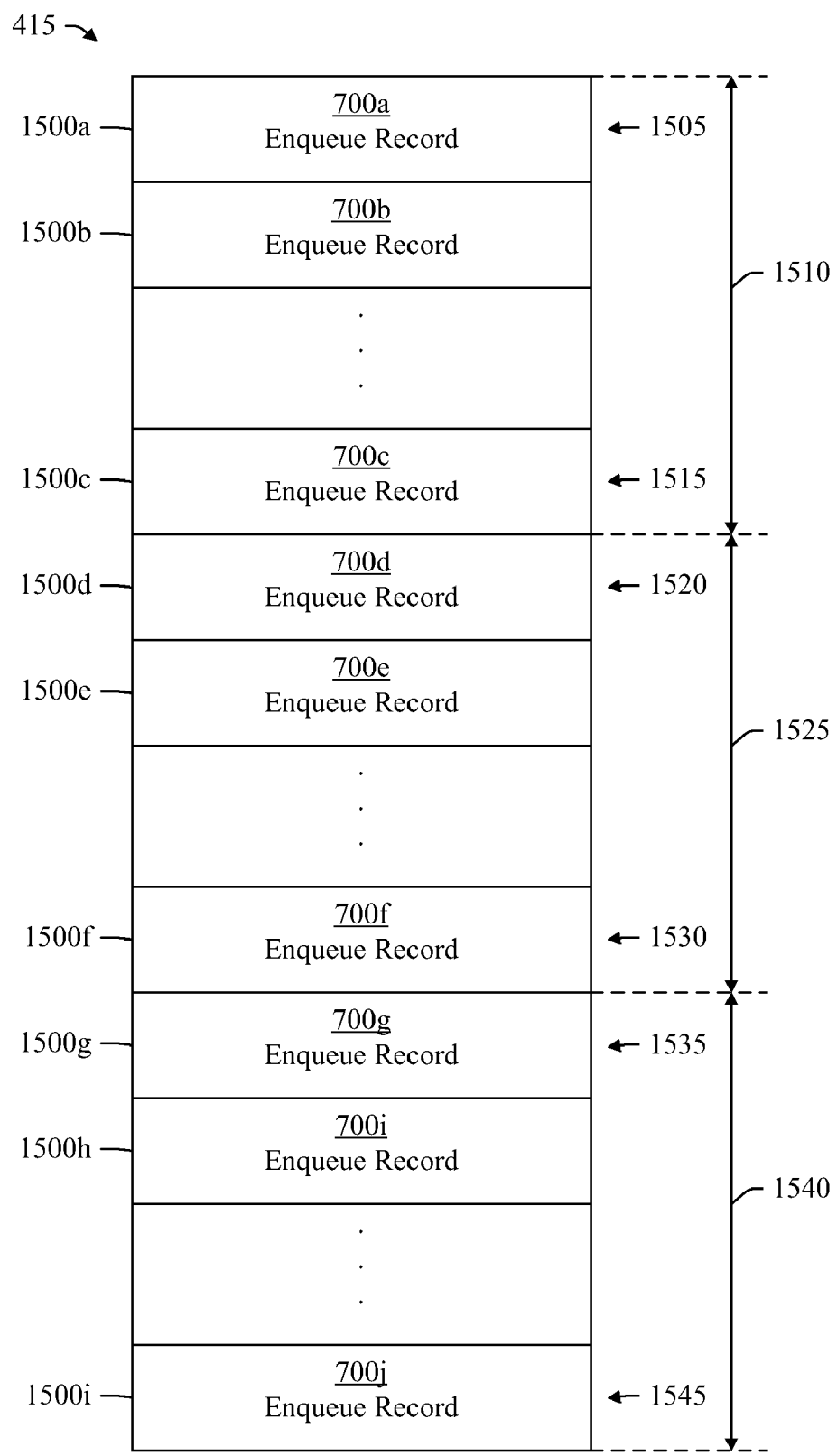
FIG. 15 is a block diagram of an enqueue memory, in accordance with an embodiment of the present invention.

FIG. 15 illustrates the enqueue memory 415, in accordance with an embodiment of the present invention. The enqueue memory 415 includes storage units 1500 (e.g., storage units 1500$a$-$i$) for storing enqueue records 700 (e.g., enqueue records 700$a$-$i$) based on identifiers (e.g., memory addresses) corresponding to the storage units 1500. For example, the enqueue memory 415 may be a random access memory (RAM), such as a static random access memory (SRAM), a dynamic random access memory (DRAM), a synchronous dynamic random access memory (SDRAM), a flash storage, or the like.

In various embodiments, the enqueue controller 400 maintains a posted circular queue 1510 in a portion of the enqueue memory 415, a non-posted circular queue 1525 in another portion of the enqueue memory 415, and a completion circular queue 1540 in another portion of the enqueue memory 415. The posted circular queue 1510 includes storage units 1500 of the enqueue memory 415 (e.g., storage units 1500$a$-$c$) for storing enqueue records 700 of posted packets. Moreover, the posted circular queue 1510 has a head 1505 and a tail 1515. The head 1505 of the posted circular queue 1510 identifies the oldest enqueue record 700 stored in the posted circular queue 1510. The tail 1515 of the posted circular queue 1510 identifies the newest enqueue record 700 stored in the posted circular queue 1510.

The non-posted circular queue 1525 includes storage units 1500 of the enqueue memory 415 (e.g., storage units 1500$d$-$f$) for storing enqueue records 700 of non-posted packets. Moreover, the non-posted circular queue 1525 has a head 1520 and a tail 1530. The head 1520 of the non-posted circular queue 1525 identifies the oldest enqueue record 700 stored in the non-posted circular queue 1525. The tail 1530 of the posted circular queue 1510 identifies the newest enqueue record 700 stored in the non-posted circular queue 1525.

The completion circular queue 1540 includes storage units 1500 of the enqueue memory 415 (e.g., storage units 1500$g$-$i$) for storing enqueue records 700 of completion packets. Moreover, the completion circular queue 1540 has a head 1535 and a tail 1545. The head 1535 of the completion circular queue 1540 identifies the oldest enqueue record 700 stored in the completion circular queue 1540. The tail 1545 of the completion circular queue 1540 identifies the newest enqueue record 700 stored in the completion circular queue 1540.

The enqueue controller 400 maintains each of the circuit queues (e.g., the posted circular queue 1510, the non-posted circular queue 1525, and the completion circular queue 1540) according to the order in which the enqueue records 700 are received from the ingress port 115 corresponding to the enqueue module 140 containing the enqueue memory 415. In this way, the enqueue controller 400 maintains a sequential order of the enqueue records 700 for each of the circular queues according to the order in which the packets corresponding to the enqueue records 700 are received by the corresponding ingress port 115. Moreover, the oldest enqueue record 700 of the circular queue is at the head of the circular queue and the newest enqueue record 700 of the circular queue is at the tail of the circular queue. In some embodiments, the enqueue controller 400 maintains a head pointer for identifying the storage unit 1500 at the head of a circular queue and a tail pointer for identifying the storage unit 1500 at the tail of the circular queue.

In some embodiments, the enqueue module 140 includes an enqueue memory 415 dedicated to storing enqueue records 700 of the posted circular queue 1510, another enqueue memory 415 dedicated to storing enqueue records 700 of the non-posted circular queue 1525, and still another enqueue memory 415 dedicated to storing enqueue records 700 of the completion circular queue 1540. In some embodiments, the enqueue controller 400 maintains a non-posted read circular queue in the enqueue memory 415 for storing enqueue records 700 of non-posted read packets. In some embodiments, the enqueue controller 400 maintains a non-posted data circular queue in the enqueue memory 415 for storing enqueue records 700 of non-posted data packets.

In various embodiments, the enqueue controller 400 selects packets stored in the ingress port 115 corresponding to the enqueue module 140 based on the ordered sequence of enqueue records 700 maintained in the enqueue queue 410, which may include one or more enqueue records 700 stored in the ordered queue 1115 and one or more enqueue records 700 stored in the dedicated storage units 1420. Moreover, the enqueue controller 400 deletes enqueue records from the enqueue queue 410 when the packet corresponding to the enqueue record 700 is routed from the ingress port 115 to an egress port 125 of the packet switch 105. In this way, the enqueue controller 400 updates the enqueue module 140 and updates the ordered sequence of enqueue records 700 stored in the enqueue queue 410.

The enqueue controller 400 further updates the ordered sequence of enqueue records 700 stored in the enqueue queue 410 by moving the oldest enqueue record 700 stored in the enqueue memory 415, if any, to the ordered queue 1115 when the ordered queue 1115 has an available storage capacity for storing an additional enqueue record 700. In this way, the enqueue controller 400 maintains the ordered sequence of the enqueue records 700 stored in the enqueue queue 410 according to the ordered sequence in which the enqueue module 140 received the enqueue records 700 from the corresponding ingress port 115.

Additionally, the enqueue controller 400 updates a dedicated storage unit 1420, for example when an enqueue record 700 is deleted from the dedicated storage unit 1420, by storing (e.g., copying) an enqueue record 700 from the enqueue memory 415 into the dedicated storage unit 1420. In this way, the enqueue controller 400 updates the dedicated storage units 1420 such that one of the dedicated storage units 1420 stores a copy of the oldest enqueue record 700 stored in the enqueue memory 415 that corresponds to a posted packet, if any. Additionally, the enqueue controller 400 updates the dedicated storage units 1420 such that the other dedicated storage unit 1420 stores a copy of the oldest enqueue record 700 stored in the enqueue memory 415 that corresponds to a completion packet, if any.

Figure 16:
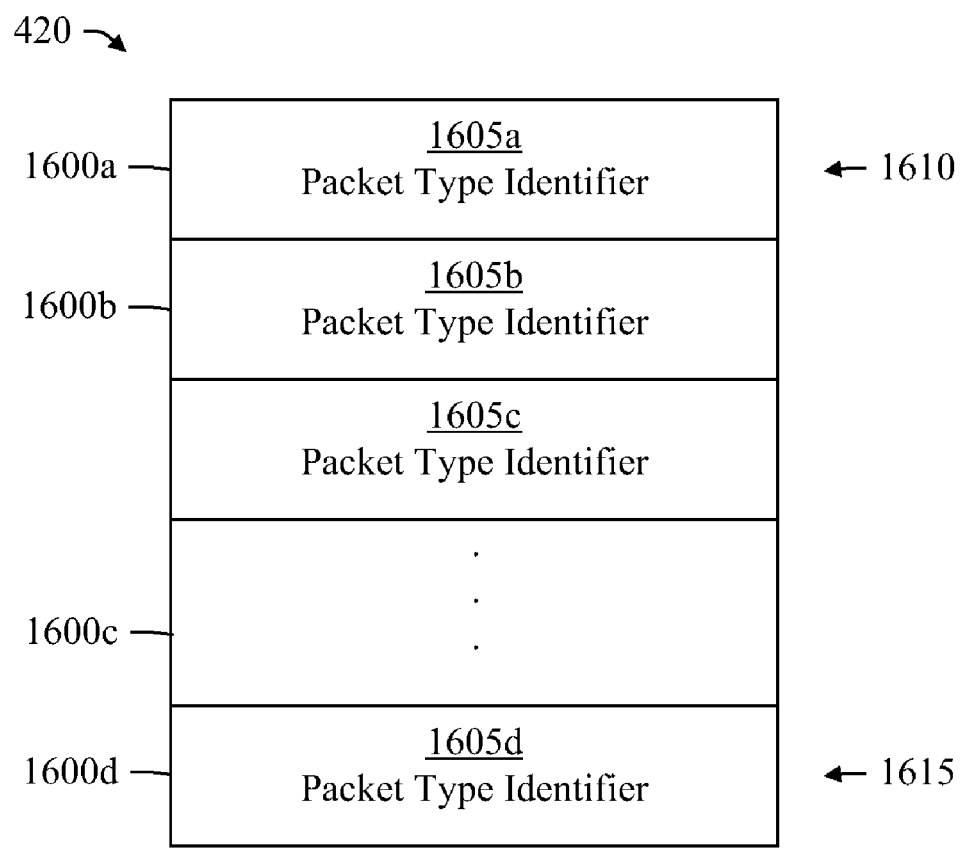
FIG. 16 is a block diagram of an enqueue memory index queue, in accordance with an embodiment of the present invention.

FIG. 16 illustrates the enqueue memory index queue 420, in accordance with an embodiment of the present invention. The enqueue memory index queue 420 includes storage units 1600 (e.g., storage units 1600a-d) for storing packet type identifiers 1605 (e.g., packet type identifiers 1605a-d) corresponding to enqueue records 700 stored in the enqueue memory 415 and identifying the packet type of the packet stored in the ingress port 115 that corresponds to the enqueue record 700. For example, a packet type identifier 1605 may identify a posted packet, a non-posted packet, or a completion packet. As another example, a packet type identifier 1605 may identify a posted packet, a non-posted read packet, a non-posted data packet, or a completion packet. Moreover, the enqueue memory index queue 420 has a head 1610 and a tail 1615. The head 1610 of the enqueue memory index queue 420 identifies the oldest packet type identifier 1605 stored in the enqueue memory index queue 420. The tail 1615 of the enqueue memory index queue 420 identifies the newest packet type identifier 1605 stored in the enqueue memory index queue 420.

The enqueue controller 400 stores the packet type identifiers 1605 into the enqueue memory index queue 420 such that the packet type identifiers 1605 are in order according to the ordered sequence in which the enqueue module 140 receives the enqueue records 700 stored in the enqueue memory 415. In this way, the enqueue controller 400 maintains a sequential order of the packet type identifiers 1605 according to the order in which the corresponding enqueue records 700 are received by the enqueue module 140.

The enqueue controller 400 determines the packet type of the packet corresponding to the oldest enqueue record 700 stored in enqueue memory 415 based on the oldest packet type identifier 1605 stored in the enqueue memory index queue 420 (e.g., the packet type identifier 1605 at the head 1610 of the enqueue memory index queue 420). Further, the enqueue controller 400 identifies the oldest enqueue record 700 stored in the enqueue memory 415 by identifying the enqueue record 700 at the head of the circular queue having the same packet type identified by the oldest packet type identifier 1605. In some embodiments, the packet type identifier 1605 corresponding to an enqueue record 700 is the same as the packet type flag 710 of the enqueue record 700.

In various embodiments, the enqueue controller 400 selects the enqueue record 700 stored in the enqueue queue 410 that corresponds to the oldest unblocked packet stored in the corresponding ingress port 115 that is allowed to be routed to a destination egress port 125 of the packet according to the set of ordering rules implemented by the packet switch 105. In some embodiments, a packet stored in the ingress port 115 is unblocked if the packet may be routed to a destination egress port 125 of the packet in a next routing cycle of the packet switch 105. Moreover, a packet stored in the ingress port 115 is blocked if the packet may not be routed to a destination egress port 125 of the packet in the next cycle of the packet switch 105. For example, the oldest packet stored in the ingress port 115 may be blocked because a destination egress port 125 of the packet is busy, a destination egress port 125 of the packet does not have available storage capacity for storing the packet, or a destination egress port 125 of the packet has not issued sufficient credits for routing the packet to the destination egress port 125.

In some embodiments, the enqueue controller 400 identifies each unblocked enqueue record 700 stored in the enqueue queue 410 and determines whether the packet corresponding to the unblocked enqueue record 700 is allowed to pass each packet corresponding to an older blocked enqueue record 700, if any, stored in the enqueue queue 410. The enqueue controller 400 determines whether the packet corresponding to the unblocked enqueue record 700 stored in the enqueue queue 410 is allowed to pass a packet corresponding to an older blocked enqueue record 700 stored in the enqueue queue 410 based on the pass flag 715 of the oldest unblocked enqueue record 700 and the set of ordering rules implemented by the packet switch 105. The enqueue controller 400 then selects the oldest unblocked enqueue record 700 stored in the enqueue queue 410 that is allowed to pass each packet corresponding to an older blocked enqueue record 700, if any, stored in the enqueue queue 410. In this way, the enqueue controller 400 selects the enqueue record 700 corresponding to the oldest unblocked routable packet stored in the ingress port 115 corresponding to the enqueue module 140 containing the enqueue queue 410.

For example, if the pass flag 715 of an unblocked enqueue record 700 stored in the enqueue queue 410 is set and the packet switch 105 is implementing the set of basic ordering rules, the enqueue controller 400 allows the packet corresponding to the unblocked enqueue record 700 stored in the enqueue queue 410 to pass a packet corresponding to an older blocked enqueue record 700 stored in the enqueue queue 410 if the packet corresponding to the unblocked enqueue record 700 is an configuration write completion and the packet corresponding to the older blocked enqueue record 700 is a posted request. As another example, if the packet corresponding to the unblocked enqueue record 700 is a posted request, the packet corresponding to the older blocked enqueue record 700 is a non-posted read request, and the packet switch 105 is implementing the basic set of ordering rules, the enqueue controller 400 allows the packet corresponding to the unblocked enqueue record 700 to pass the packet corresponding to the older blocked enqueue record 700 stored in the enqueue queue 410.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A packet switch comprising:
   egress ports;
   an ingress port configured to receive packets in a sequential order and generate enqueue records corresponding to the packets, each of the enqueue records including a pass flag indicating whether a corresponding packet is permitted to be routed through the packet switch ahead of another packet preceding the corresponding packet in the sequential order based on a permissive passing rule;
   an enqueue structure coupled to the ingress port and comprising an enqueue queue and an enqueue memory, the enqueue queue comprising:
      an ordered queue configured to store based on the sequential order older enqueue records corresponding to packets stored in the ingress port, the enqueue memory configured to store based on the sequential order newer enqueue records corresponding to packets stored in the ingress port; and dedicated storage units configured to store a copy of the oldest enqueue record stored in the enqueue memory corresponding to a posted packet and a copy of the oldest enqueue record stored in the enqueue memory corresponding to a completion packet;

an enqueue controller coupled to the enqueue structure and configured to determine a routing order for routing the packets from the ingress port to the egress ports based on the enqueue records and a set of ordering rules including the permissive passing rule that indicates whether a subsequent packet is permitted to be routed through the packet switch ahead of a previous packet preceding the subsequent packet in the sequential order based on a packet type of the previous packet and a packet type of the subsequent packet, a prohibitive passing rule that indicates whether a subsequent packet is prohibited from being routed through the packet switch ahead of a previous packet preceding the subsequent packet in the sequential order and a requisite passing rule that indicates when a subsequent packet is required to be routed through the packet switch ahead of a previous packet preceding the subsequent packet in the sequential order when the previous packet is blocked; and a switch fabric coupled to the ingress port and the egress ports, the switch fabric configured to route the packets from the ingress port to the egress ports in the routing order.

2. The packet switch of claim 1, wherein the enqueue controller is further configured to determine the oldest packet stored in the ingress port is blocked based on the oldest enqueue record stored in the enqueue queue, identify unblocked routable packets stored in the ingress port based on the enqueue records stored in the enqueue queue and the set of ordering rules, and select the oldest unblocked routable packet for routing ahead of the blocked oldest packet stored in the ingress port.

3. The packet switch of claim 1, further comprising egress port status modules corresponding to the egress ports and configured to generate port states corresponding to the egress ports, each of the port states indicating a number of credit issued for the corresponding egress port, the enqueue controller further configured to determine the routing order for routing the packets from the ingress port to the egress ports based on the enqueue records stored in the enqueue queue, the set of ordering rules, and the port states.

4. The packet switch of claim 1, wherein each of the enqueue records further includes a packet pointer identifying the corresponding packet stored in the ingress port corresponding to the enqueue record, a packet type flag indicating a packet type of the packet identified by the packet pointer, a port map identifying at least one of the egress ports as a destination egress port of the packet type identified by the packet pointer, and a credit state indicating a number of credits for routing the packet identified by the packet pointer to an egress port of the packet switch.

5. The packet switch of claim 4, wherein at least one of the enqueue records further includes a flow control flag having fewer data bits than a transaction identifier of the packet identified by the packet pointer of the enqueue record for controlling packet flow through the packet switch.

6. The packet switch of claim 1, further comprising egress port status modules corresponding to the egress ports and configured to generate port states corresponding to the egress ports, each of the port states indicating a number of credit issued for the corresponding egress port, the enqueue controller further configured to determine the routing order for routing the packets from the ingress port to the egress ports based on the enqueue records stored in the enqueue queue, the set of ordering rules, and the port states.

7. A packet switch comprising:

egress ports;

an ingress port configured to receive packets in a sequential order and generate enqueue records corresponding to the packets, each of the enqueue records including a posted pass flag indicating whether a corresponding packet is permitted to be routed through the packet switch ahead of a posted packet preceding the corresponding packet in the sequential order based on a permissive passing rule, at least one of the enqueue records including a flow control flag having fewer data bits than a transaction identifier of the corresponding packet for controlling packet flow through the packet switch;

an enqueue structure coupled to the ingress port and comprising an enqueue queue and an enqueue memory, the enqueue queue comprising:

an ordered queue configured to store based on the sequential order older enqueue records corresponding to packets stored in the ingress port, the enqueue memory configured to store based on the sequential order newer enqueue records corresponding to packets stored in the ingress port; and dedicated storage units configured to store a copy of the oldest enqueue record stored in the enqueue memory corresponding to a posted packet stored in the ingress port and a copy of the oldest enqueue record stored in the enqueue memory corresponding to a completion packet stored in the ingress port;

an enqueue controller coupled to the enqueue structure and configured to determine a routing order for routing the packets from the ingress port to the egress ports based on the enqueue records and a set of ordering rules including the permissive passing rule that indicates whether a subsequent packet is permitted to be routed through the packet switch ahead of a previous packet preceding the subsequent packet in the sequential order based on a packet type of the previous packet and a packet type of the subsequent packet, a prohibitive passing rule that indicates whether a subsequent packet is prohibited from being routed through the packet switch ahead of a previous packet preceding the subsequent packet in the sequential order, and a requisite passing rule that indicates when a subsequent packet is required to be routed through the packet switch ahead of a previous packet preceding the subsequent packet in the sequential order when the previous packet is blocked; and a switch fabric coupled to the ingress port and the egress ports, the switch fabric configured to route the packets from the ingress port to the egress ports in the routing order.

8. The packet switch of claim 7, wherein the enqueue controller is further configured to determine the oldest packet stored in the ingress port is blocked based on the oldest enqueue record stored in the enqueue queue and identify unblocked routable packets stored in the ingress port based on the enqueue records stored in the enqueue queue and the set of ordering rules, and select the oldest unblocked routable packet for routing ahead of the blocked oldest packet stored in the ingress port.

9. The packet switch of claim 7, wherein each of the enqueue records further includes a packet pointer identifying the corresponding packet stored in the ingress port corresponding to the enqueue record, a packet type flag indicating a packet type of the packet identified by the packet pointer, a port map identifying at least one of the egress ports as a destination egress port of the packet type identified by the packet pointer, and a credit state indicating a number of credits for routing the packet identified by the packet pointer to an egress port of the packet switch.

10. A method of routing packets through a packet switch, the method comprising:

receiving packets at an ingress port of a packet switch in a sequential order;

storing the packets in the ingress port;

generating enqueue records corresponding to the packets, each of the enqueue records including a pass flag indicating whether a corresponding packet is permitted to be routed through the packet switch ahead of another packet preceding the corresponding packet in the sequential order based on a permissive passing rule;

storing older enqueue records into an enqueue queue based on the sequential order;

storing newer enqueue records into an enqueue memory based on the sequential order;

storing a copy of the oldest enqueue record stored in the enqueue memory and corresponding to a posted packet into the enqueue queue;

storing a copy of the oldest enqueue record stored in the enqueue memory and corresponding to a completion packet into the enqueue queue;

determining a routing order for routing the packets from the ingress port to egress ports based on the enqueue records stored in the enqueue queue and a set of ordering rules including the permissive passing rule that indicates whether a subsequent packet is permitted to be routed through the packet switch ahead of a previous packet preceding the subsequent packet in the sequential order based on a packet type of the previous packet and a packet type of the subsequent packet, a prohibitive passing rule that indicates whether a subsequent packet is prohibited from being routed through the packet switch ahead of a previous packet preceding the subsequent packet in the sequential order and a requisite passing rule that indicates when a subsequent packet is required to be routed through the packet switch ahead of a previous packet preceding the subsequent packet in the sequential order when the previous packet is blocked; and routing the packets from the ingress port to the egress ports in the routing order.

11. The method of claim 10, wherein determining the routing order for routing the packets from the ingress port to the egress ports comprises:

determining the oldest packet stored in the ingress port is blocked based on the oldest enqueue record stored in the enqueue queue;

identifying unblocked routable packets stored in the ingress port based on the enqueue records stored in the enqueue queue and the set of ordering rules; and selecting the oldest unblocked routable packet for routing ahead of the blocked oldest packet stored in the ingress port.

12. The method of claim 11, wherein identifying unblocked routable packets stored in the ingress port comprises:

determining for each packet stored in the ingress port that the packet is not prohibited from passing each previous packet stored in the ingress port based on the enqueue records stored in the enqueue queue;

determining the packet is permitted or required to pass each previous packet stored in the ingress port based on the enqueue records stored in the enqueue queue;

determining the packet is unblocked based on the enqueue record of the packet; and selecting the packet as an unblocked routable packet.

13. The method of claim 12, wherein generating the enqueue records corresponding to the packets further comprises generating a flow control flag of the enqueue record corresponding to the packet based on a transaction identifier of the packet, and wherein the flow control flag includes fewer data bits than the transaction identifier of the packet corresponding to the enqueue record.

14. The method of claim 10, wherein generating the enqueue records corresponding to the packets comprises:

generating the pass flag of the enqueue record corresponding to a packet based on a set of ordering rules to indicate whether a permissive pass rule is applicable to the packet; and generating the pass flag of the enqueue record corresponding to the packet to indicate a packet type of the packet;

generating a packet pointer of the enqueue record corresponding to the packet to identify the packet;

generating a port map of the enqueue record corresponding to a packet to indicate a destination egress port of packet; and generating a credit state of the enqueue record corresponding to the packet to indicate credits requested for routing the packet to the destination egress port of the packet.

* * * * *